(12) United States Patent
Ushiwata et al.

(10) Patent No.: US 7,930,962 B2
(45) Date of Patent: Apr. 26, 2011

(54) CUTTER WITH LASER GENERATOR THAT IRRADIATES CUTTING POSITION ON WORKPIECE TO FACILITATE ALIGNMENT OF BLADE WITH CUTTING POSITION

(75) Inventors: Shigeharu Ushiwata, Hitachinaka (JP); Shinji Takano, Hitachinaka (JP); Hideaki Terashima, Hitachinaka (JP); Kenichi Matsunaga, Hitachinaka (JP); Ryuichi Imamura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 187 days.

(21) Appl. No.: 12/073,218

(22) Filed: Mar. 3, 2008

(65) Prior Publication Data
US 2008/0156163 A1 Jul. 3, 2008

Related U.S. Application Data

(60) Continuation of application No. 11/509,759, filed on Aug. 25, 2006, now Pat. No. 7,367,254, which is a division of application No. 09/930,442, filed on Aug. 16, 2001, now Pat. No. 7,207,251, which is a continuation-in-part of application No. 09/499,385, filed on Feb. 7, 2000, now abandoned.

(30) Foreign Application Priority Data

| Feb. 5, 1999 | (JP) | P11-028275 |
| Feb. 5, 1999 | (JP) | P11-028277 |
| Nov. 26, 1999 | (JP) | P11-335411 |
| Dec. 3, 1999 | (JP) | P11-344301 |

(51) Int. Cl.
*B26D 7/00* (2006.01)
*B27B 5/20* (2006.01)

(52) U.S. Cl. ............ 83/520; 83/521; 83/468.3; 83/581
(58) Field of Classification Search ............ 83/521, 83/432, 522.14, 581, 468.3, 520; 362/259, 362/287–289, 89, 90
See application file for complete search history.

(56) References Cited

U.S. PATENT DOCUMENTS
2,806,492 A 9/1957 Becker
(Continued)

FOREIGN PATENT DOCUMENTS
DE 3406904 9/1984
(Continued)

*Primary Examiner* — Boyer D Ashley
*Assistant Examiner* — Omar Flores-Sánchez
(74) *Attorney, Agent, or Firm* — McDermott Will & Emery LLP

(57) ABSTRACT

A cutter including a base, a holder, a cutter blade portion, and a laser generator. The holder is supported on the base portion in an upright posture. The cutter blade portion supports a moving blade. The cutter blade portion is supported on the holder movable between an upper position and a lower position. The cutter blade portion is moved into the lower position to cut a workpiece supported on the base using the moving blade. The laser generator is attached to the holder or the cutter blade portion in an orientation to direct at least a portion of the laser light onto a position on the workpiece that is directly beneath the cutter blade portion when the cutter blade portion is in the upper position. Alternatively, a holder has a shaft support portion, and a slide shaft is axially slidably supported by the shaft support portion. A front end of the slide shaft has a hinge holder which pivotally supports the cutting blade portion. A laser generator is fixed to a front side of the hinge holder.

5 Claims, 23 Drawing Sheets

U.S. PATENT DOCUMENTS

| | | |
|---|---|---|
| 3,736,402 A | 5/1973 | Mefferd et al. |
| 3,783,404 A | 1/1974 | Matsuoka |
| 3,787,693 A | 1/1974 | Stone |
| 3,916,336 A | 10/1975 | Kaiser |
| 4,257,297 A | 3/1981 | Nidbella |
| 4,469,931 A | 9/1984 | Macken |
| 4,647,155 A | 3/1987 | Bjorklund et al. |
| 4,665,529 A | 5/1987 | Baer et al. |
| 4,738,044 A | 4/1988 | Osterhout |
| 4,805,500 A | 2/1989 | Saito et al. |
| 4,833,782 A | 5/1989 | Smith |
| 4,856,020 A | 8/1989 | Ortiz |
| 4,885,967 A | 12/1989 | Bell et al. |
| 4,911,532 A | 3/1990 | Hidaka |
| 4,916,713 A | 4/1990 | Gerber |
| 4,939,863 A | 7/1990 | Alexander et al. |
| 5,038,481 A | 8/1991 | Smith |
| 5,056,097 A | 10/1991 | Meyers |
| 5,060,548 A | 10/1991 | Sato et al. |
| 5,177,309 A | 1/1993 | Willoughby et al. |
| 5,285,708 A | 2/1994 | Bosten |
| 5,359,779 A | 11/1994 | Polk et al. |
| 5,373,362 A | 12/1994 | Kano et al. |
| 5,375,495 A | 12/1994 | Bosten |
| 5,446,635 A | 8/1995 | Jehn |
| 5,461,790 A | 10/1995 | Olstowski |
| 5,675,899 A | 10/1997 | Webb |
| 5,996,460 A | 12/1999 | Waite |
| 6,397,717 B1 | 6/2002 | Waite |
| 6,481,322 B1 | 11/2002 | Hsiung |
| 6,976,764 B2 | 12/2005 | Cheng et al. |
| 2003/0010173 A1* | 1/2003 | Hayden ............... 83/520 |

FOREIGN PATENT DOCUMENTS

| | | |
|---|---|---|
| DE | 29616604 U1 | 12/1996 |
| JP | 58-56460 | 4/1983 |
| JP | 61-143116 | 9/1986 |
| JP | 2-32337 Y2 | 3/1987 |
| JP | 62-150019 | 9/1987 |
| JP | 6-701 U | 1/1994 |
| JP | 10-6934 A | 1/1998 |
| JP | 63-92348 U | 6/1998 |
| WO | WO 93/17842 | 9/1993 |

* cited by examiner

CUTTER WITH LASER GENERATOR THAT IRRADIATES CUTTING POSITION ON WORKPIECE TO FACILITATE ALIGNMENT OF BLADE WITH CUTTING POSITION

CROSS REFERENCE TO RELATED APPLICATION

This application is a continuation application of U.S. patent application Ser. No. 11/509,759, filed Aug. 25, 2006, now U.S. Pat. No. 7,367,254 which is a divisional of U.S. patent application Ser. No. 09/930,442 filed on Aug. 16, 2001, now U.S. Pat. No. 7,207,251 which is a continuation-in-part of U.S. patent application Ser. No. 09/499,385 filed Feb. 7, 2000, now abandoned, and further claims priority based on 35 U.S.C. section 119 to Japanese Patent Application Nos. 11-28275 filed Feb. 5, 1999, 11-28277 filed Feb. 5, 1999, 11-335411 filed Nov. 26, 1999, and 11-344301 filed Dec. 3, 1999. The entire disclosures of the prior applications Ser. Nos. 11,509,759, 09/930,442 and 09/499,385 are hereby incorporated by reference.

BACKGROUND OF THE INVENTION

1. Field of the Invention

The present invention relates to a cutter, such as a tabletop circular saw for cutting wooden boards.

2. Description of the Related Art

There has been known a cutter with a circular blade and a laser generator. The laser generator irradiates the workpiece with a laser light to indicate the position where the cutting is to be performed. The operator then uses the circular blade to cut the workpiece material at the position indicated by the laser light.

Japanese Utility-Model-Application Publication No. SHO-62-150019 discloses a cutter with a blade positioned above a workpiece and a laser generator fixed on the blade support at a position above the blade. Before cutting the workpiece, the user draws a mark on the workpiece to indicate the position on the workpiece to be cut. The user then aligns the laser light emitted from the laser generator with the mark on the workpiece, and lowers the blade to cut the workpiece.

The laser generator disclosed in Japanese Utility-Model-Application Publication No. SHO-62-150019 is fixed at the blade support. Therefore, if the laser light is not actually in alignment with the location that the blade cuts, the user must attempt to compensate for this positional difference by intentionally shifting the laser light out of alignment with the cutting position mark on the workpiece before cutting the workpiece. This increases the possibility that the workpiece will not be cut in the desired cutting position.

West German Patent Publication No. 3406904 discloses a cutter provided with a laser generator mounted on a slide bar. The laser generator can be freely slid horizontally along the slide bar to adjust position where the laser light irradiates the workpiece. However, minute adjustment of where the laser light irradiates the workpiece is difficult with this configuration.

U.S. Pat. Nos. 5,285,708 and 5,375,495 disclose cutters, each having a cutting portion that is disposed above the workpiece, and a laser generator that is disposed above and ahead of the cutting blade. A rail is suspended above the cutting blade so as to extend in a widthwise direction of the cutting blade. A groove is formed in the laser generator to fit in the rail. The laser generator is guided by along the rail so can easily moved in the horizontal direction. However, if the groove in the laser generator and the rail have a poor fit with gaps therebetween, then horizontal movement of the laser generator will be unstable so that the cutting position cannot be accurately indicated using the laser.

Next, a conventional mechanism for adjusting alignment of a laser light with a vertical reference line Y and with a horizontal reference line X will be explained with reference to FIGS. 1 (a) to 3. A cylindrical laser generator 70 is supported in a support member 71 by a fixing screw 72. The fixing screw 72 presses the laser generator 70 downward in the support member 71. The support member 71 is fixed to a base by two bolts 74, 74. One bolt 74 passes through a circular hole 76 and the other bolt 74 passes an elongated hole 77.

As shown in FIGS. 1 (a) and 1 (b), when laser light L1 from the cylindrical laser generator 70 is to be aligned with a vertical reference line Y, the fixing screw 72 is loosened and the cylindrical laser generator 70 is rotated within the support member 71 until the laser light L1 is aligned with the vertical reference line Y. Once alignment is achieved, the fixing screw 72 is retightened to fix the cylindrical laser generator 70 in place in the support member 71.

As shown in FIG. 2, when the laser light L1 is to be aligned with a horizontal reference line X, the bolts 74, 74 are loosened and the support member 71 is pivoted around the circular hole 76 within the horizontal plane. When the laser light L1 is aligned with the horizontal reference line X, then the bolts 74, 74 are tightened to fix the support member 71 in place.

However, because the tip of the fixing screw 72 is not completely flat, the cylindrical laser generator 70 might be moved out of alignment when the fixing screw 72 is tightened. When this happens, the operator must repeat the adjustment process until the laser light L1 is accurately aligned with the vertical reference line Y.

Also, when the bolt 74 is tightened, the support member 71 might move because the contacting surface of the support member 71 or the bolts 74 are slanted. In this case also, the operator must repeat the adjustment process until the laser light L1 is accurately aligned with the horizontal reference line X.

SUMMARY OF THE INVENTION

As shown in FIGS. 4 and 5, normally laser light L1 has a different width W1 than the width W2 cut by the blade. For example, a circular blade 22 with an outer diameter of 255 mm will cut the workpiece to a width W2 of generally 2.5 mm. In contrast, laser light L1 normally has a width W1 of about 0.8 mm. For this reason, an operator could conceivably align the laser light L1 with the cutting position on the workpiece in any of the ways shown in FIGS. 4 to 7 (b). For example, the operator could conceivably align the laser light L1 with the exterior of the left edge of the cutting width as shown in FIGS. 5 and 7 (a), or with the exterior of the right edge of the cutting width as shown in FIG. 7 (b).

Alternatively, the operator could conceivably align the laser light L1 with the interior of the left edge of the blade width W2 as shown in FIGS. 4 and 6 (a), or with the interior of the right edge of the blade width W2 as shown in FIG. 6 (b). However, it is impossible to align the laser light L1 with the interior of the left or right edges of the blade width W2 using the configuration disclosed in U.S. Pat. Nos. 5,285,708 and 5,375,495, because the cutting blade is interposed between the laser generator and the workpiece. If a user attempts to irradiate the workpiece in the manner indicated either in FIGS. 6 (a) or 6 (b), that is, with the laser light L1 irradiating the interior of either the left or right edge of the cutting width W2, then the laser light L1 will hit the upper edge of the cutting blade itself, rather than the workpiece. In other words, the cutting blade will block the laser light L1 and prevent the laser light from indicating the cutting position on the workpiece. As a result, the user is only capable of irradiating the workpiece with the laser light in alignment with the exterior of the right or left edge of the cutting width W2.

West German Patent No. DE 29616604 discloses a cutter with a laser generator disposed far from the blade portion. With this configuration, a long extension member must be provided to connect the laser generator with the blade holding member, so that the laser generator is disposed far enough from the blade holding member. This extension member makes gets in the way during cutting operations, and contributes to undesirable overall enlargement of the cutter.

It is an object of the present invention to overcome the above-described problems and to provide a cutter with a laser generator capable of irradiating a desired position on the workpiece with laser light, without interference from the cutter blade.

It is another objective of the present invention to provide a cutter with a laser generator capable of adjusting alignment of emitted laser light in both the horizontal and vertical directions.

It is still another objective of the present invention to provide a cutter with a laser generator wherein width of laser light emitted by the laser generator can be adjusted.

In order to achieve the above-described objectives, a cutter according to one aspect of the present invention includes a base for supporting a workpiece, a holder supported on the base portion in an upright posture, a cutter blade portion, and a laser generator for emitting laser light. The cutter blade portion is adapted for supporting a moving blade that cuts the workpiece. The cutter blade portion is supported on the holder movable between an upper position and a lower position, wherein the cutter blade portion is closer to the base in the lower position than in the upper position.

The laser generator is attached to one of the holder and the cutter blade portion in an orientation to direct at least a portion of the laser light onto a position on the workpiece that is directly beneath the cutter blade portion with respect to the cutter blade portion in the upper position. With this configuration, a desired position to cut the workpiece can be indicated even if the position is directly beneath the cutting blade.

A cutter according to another aspect of the present invention includes a base, a cutter blade portion, a laser generator, a laser generator support member, and means for moving the light emitting portion of the laser generator in a horizontal direction. The laser generator support member supports therein the laser generator slidable in the horizontal direction. The moving means is adapted for moving the light emitting portion of the laser generator in the horizontal direction. With this configuration, the position of the light emitting portion can be easily adjusted in the horizontal direction using a simple moving means such as a screw.

A cutter according to still another aspect of the present invention includes a base, a cutter blade portion, a laser generator, a laser generator support member, a pivot means, first and second regulation members screwingly fitted in the laser generator support member, and first and second resilient means. The pivot means enables the laser generator to pivot horizontally and vertically in the laser generator support member. The first regulation member presses against the laser generator to pivot the laser generator horizontally about the pivot means, and the second regulation member presses against the laser generator to pivot the laser generator vertically about the pivot means. The first and second resilient means urge the laser generator toward the first and second regulation members, respectively. This configuration enables easy adjustment of the laser generator in both vertical and horizontal directions, while eliminating any looseness of fit between the laser generator and the laser generator support member.

A cutter according to a further aspect of the present invention includes a base portion, a cutter blade portion, a laser generator, a convex lens provided in the laser generator, and a lens moving unit. The convex lens is for adjusting the focal point of the laser light emitted by the laser generator. The lens moving unit is for moving the convex lens parallel with optical axis of the laser light emitted from the laser generator to change the width of the laser light. With this configuration, the width of the laser light can be adjusted by merely using the lens moving unit to move the position of the convex lens.

A cutter according to still a further aspect of the present invention includes a base portion, a cutter blade portion, a laser generator, and a movement member. The laser generator has a light emitting portion from which the laser light is emitted, and a stationary wall positioned in front of the light emitting portion. A movable member is disposed in confrontation with the stationary wall and is movable toward and away from the stationary wall for changing a width of the laser light.

A cutter according to still another aspect of the present invention includes a base portion, a holder, a cutter blade portion provided on an upper portion of the holder, a laser generator provided on the holder, and a cleaning mechanism. The cutter blade portion is adapted for free vertical movement toward and away from the base portion between an uppermost position to a lowermost position. The cleaning mechanism contacts a light emitting portion of the laser generator in linking association with vertical movement of the cutter blade portion from the uppermost position to the lowermost position. The cleaning mechanism cleans off the light emitting portion by said contact. With this configuration, the light emitting portion of the laser generator will be automatically cleaned each time the cutter is used to cut a workpiece.

A cutter according to still another aspect of the present invention includes the base, a holder, at least one slide shaft, a hinge holder, a cutter blade portion, and a laser generator. The holder is supported on the base portion in an upright posture, and has a slide shaft support portion. The at least one slide shaft extends through the slide shaft support portion and is slidably movable in a frontward and a rearward direction with respect to the slide shaft support portion. The hinge holder fixed to a front end of the at least one slide shaft. The cutter blade portion is adapted for supporting a moving blade that cuts the workpiece. The cutter blade portion is supported on the hinge holder so as to be movable between an upper position and a lower position. The cutter blade portion is closer to the base in the lower position than in the upper position. The laser generator is adapted for emitting laser light. The laser generator is attached to a front side of the hinge holder in an orientation to direct at least a portion of the laser light onto a position on the workpiece that is directly beneath the cutter blade portion with respect to the cutter blade portion in the upper position.

BRIEF DESCRIPTION OF THE DRAWINGS

The particular features and advantages of the invention as well as other objects will become more apparent from the following description taken in connection with the accompanying drawings, in which:

FIG. 1 (*b*) is a schematic view indicating a laser light out of alignment from a vertical reference line;

FIG. 6 (b) is a schematic view showing a workpiece irradiated in a conceivable manner by a laser light along an inner right edge of a width to be cut;

FIG. 7 (b) is a schematic view showing a workpiece irradiated in a conceivable manner by a laser light along an outer right edge of a width to be cut;

FIG. 28 (b) is a schematic view showing laser light from the laser generators of FIG. 28 (a) out of alignment from a vertical reference line;

DETAILED DESCRIPTION OF THE PREFERRED EMBODIMENTS

Figure 1A:
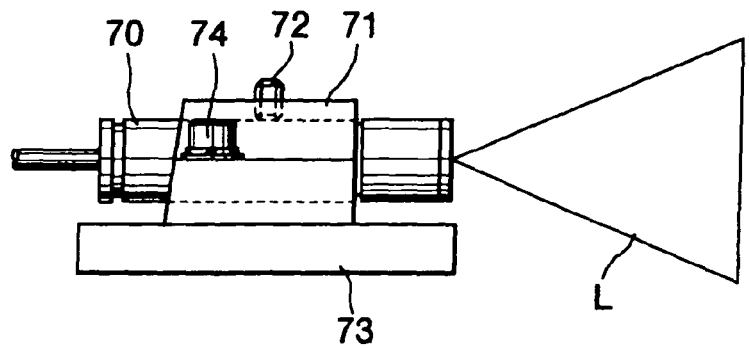
FIG. 1 (*a*) is a side view showing a conventional laser unit.
Figure 1B:
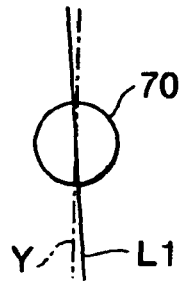
Figure 2:
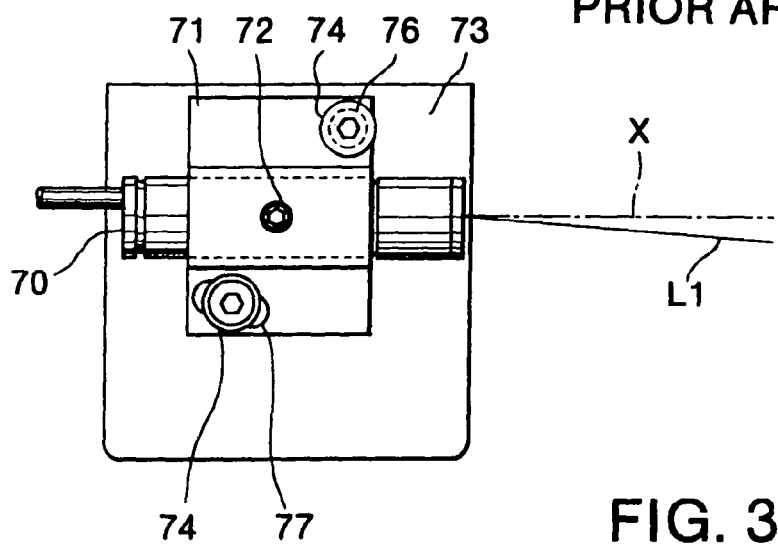
FIG. 2 is a top view of the conventional laser unit shown in FIG. 1 (a), with laser light emitted from the laser unit out of alignment with a horizontal reference line.
Figure 3:
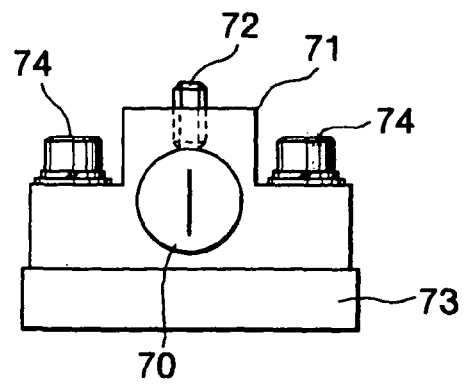
FIG. 3 is a side view of the conventional laser unit shown in FIG. 1 (a)

Cutters according to first through thirteenth embodiments of the present invention will be explained while referring to the accompanying drawings. Unless otherwise noted, orientation terms, such as left, right, front, rear, up, and down, are used with respect to the normal orientation of the device for normal use. The cutters according to the first through eleventh embodiments have substantially the same configuration with exception of components relating to the laser unit. As will be described in more detail later, the laser units of the first through sixth embodiments are configured to enable adjustment in horizontal position of the laser generator. The laser units of the seventh through ninth embodiments include configuration that enables adjustment of the laser generator to align emitted light in the vertical and horizontal directions. The laser units of the tenth and eleventh embodiments are configured to enable adjustment in the width of the laser light emitted from the laser generator. The cutters according to the twelfth and thirteenth embodiments are the modifications to the cutters of the first through eleventh embodiment.

First, a cutter D1 according to the first embodiment will be described while referring to FIGS. 8 to 14. As shown in FIG.

8, the cutter D1 has a base 1, a turntable 2, a fence 3, a holder shaft 4, a holder 10, a clamp lever 5, a shaft 11, a cutter mechanism 20, and a laser unit U. The turntable 2 is supported on the center of the base 1 so as to be freely rotatable horizontally. The upper surface of the turntable 2 shares the same plane with the upper surface of the base 1. A workpiece M, such as a wooden board, is placed on the upper surfaces of the base 1 and the turntable 2. The fence 3 is fixed on the upper surface of the base 1 to support the side surface of the workpiece M. The holder 10 is supported in an upright posture on the rear end of the turntable 2 by the holder shaft 4. The axial center of the holder shaft 4 is aligned substantially with the upper surface of the turntable 2. The holder 10 can be pivoted leftward or rightward with respect to the surface of the turntable 2 about the holder shaft 4.

Figure 9:
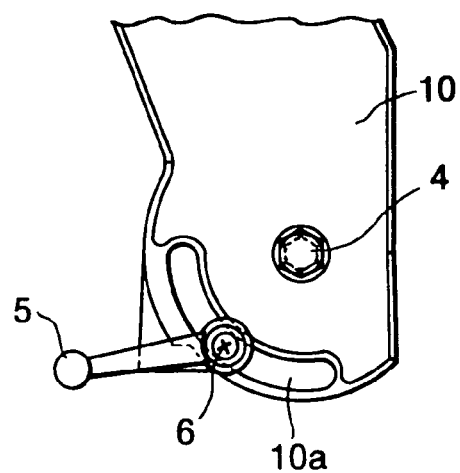
FIG. 9 is a partial view showing the cutter from the rear.

As shown in FIG. 9, an elongated hole 10a is formed in the rear portion of the holder 10 with a curved shape centered on the holder shaft 4. The clamp lever 5 passes through the elongated hole 10a. A screw portion 6 formed on the tip of the clamp lever 5 is screwed into a screw hole formed in the rear surface of the turntable 2. When the screw portion 6 of the clamp lever 5 is loosened, the holder 10 can be pivoted around the holder shaft 4 within the range defined by the elongated hole 10a. When the screw portion 6 is retightened, the holder 10 is squeezed between the turntable 2 and the clamp lever 5 and fixed in a desired position. It should be noted that the elongated hole 10a is formed with an arc range enabling the holder 10 to be pivoted left and right within a 45-degree angle.

The cutter mechanism 20 is supported above the holder 10 on a shaft 11 to be freely swingable up and down with respect to the upper surface of base 1. A spring 12 is provided between the holder 10 and the cutter mechanism 20 to urge the cutter mechanism 20 upward.

Figure 8:
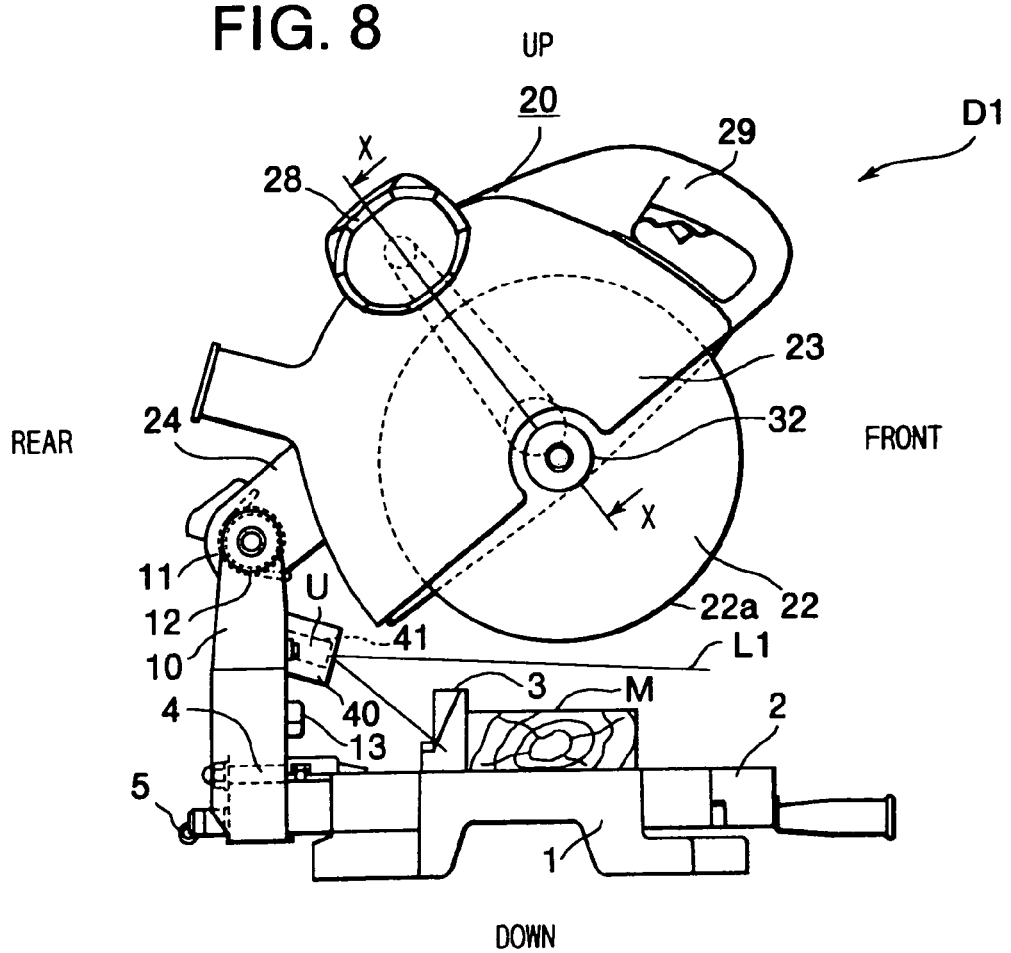
FIG. 8 is a side view showing a cutter according to a first embodiment of the present invention.
Figure 10:
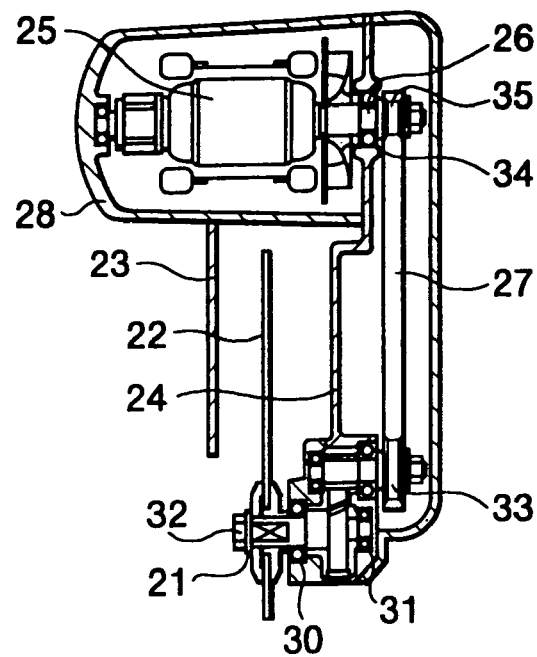
FIG. 10 is a cross-sectional view taken along line X-X of FIG. 8.

As shown in FIGS. 8 and 10 the cutter mechanism 20 includes a cutting blade shaft 21, a cutting blade, such as a circular saw blade 22, a saw cover 23, a gear case 24, and a handle 29. The cutter mechanism also includes a motor 25, a motor shaft 26, a motor housing 28, bearings 30, 31, a pulley 33, and a transmission belt 27.

The saw cover 23 covers the upper half of the cutting blade 22 and is formed integrally with the gear case 24. The motor housing 28 is positioned above the gear case 24 and covers and supports the motor 25 and the motor shaft 26. The cutting blade shaft 21 is positioned below the gear case 24. As shown in FIG. 10, the cutting blade 22 is fixed on one end of the cutting blade shaft 21 by a bolt 32 and is rotatably supported on the bearings 30, 31. The motor shaft 26 is rotatably supported on a bearing 34. The pulley 35 is provided on the exposed tip of the motor shaft 26 at a position above a pulley 33. The transmission belt 27 spans between the pulleys 33, 35. Power from the motor 25 is transmitted to the cutting blade 22 through the motor shaft 26, the pulleys 35, 33, the transmission belt 27, and the cutting blade shaft 21 to drivingly rotate the cutting blade 22.

Figure 11:
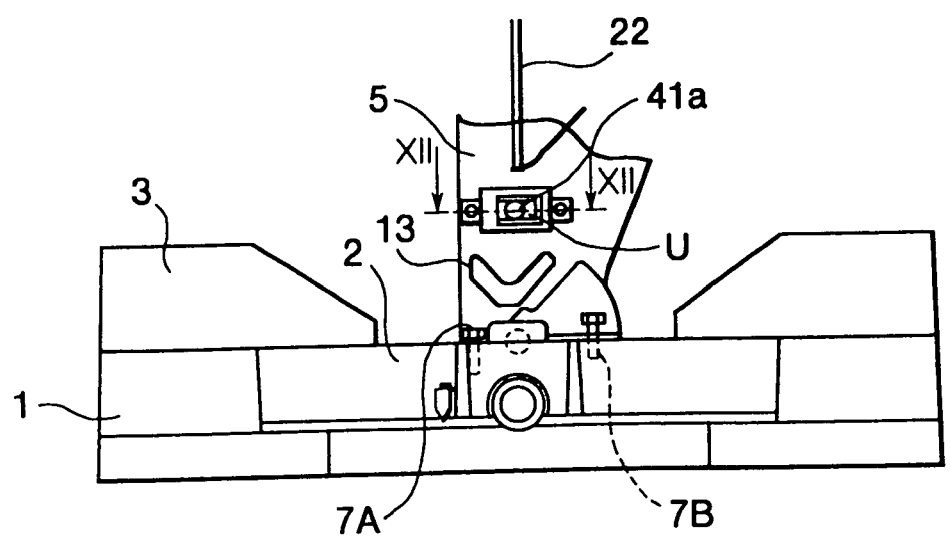
FIG. 11 is a partial view showing the cutter from the front.

As shown in FIGS. 8 and 11, a V-shaped protrusion portion 13 is mounted on the front surface of the holder 10. Stopper bolts 7A, 7B are screwingly fitted in a vertically aligned orientation in the rear upper surface of the turntable 2 at positions along the movement orbit of the protrusion portion 13. Therefore, when the holder 10 is tilted leftward or rightward, then the protrusion portion 13 will abut the head portion of the corresponding stopper bolt 7A, 7B once the holder 10 is tilted to a predetermined angle. In other words, the bolts 7A, 7B determine the tilting range possible of the cutter mechanism 20. According to the present embodiment, the stopper bolts 7A, 7B are disposed to abut the protrusion portion 13 when the holder 10 is pivoted to the extreme left or right (as viewed in FIG. 11) of a 45 degree range.

Although not shown in the drawings, a blade groove plate is fixed to the upper surface of the turntable 2. The blade groove plate is formed with a groove at its center into which the cutting blade 22 enters during cutting operations for cutting a workpiece M. During operations for cutting the workpiece M, the lower edge of the cutting blade 22 drops below the upper surface of the turntable 2. At this time, the cutting blade 22 enters into the groove of the groove plate so that the cut surface of the workpiece M can be prevented from being roughened or scuffed by the edge of the blade 22.

Figure 12:
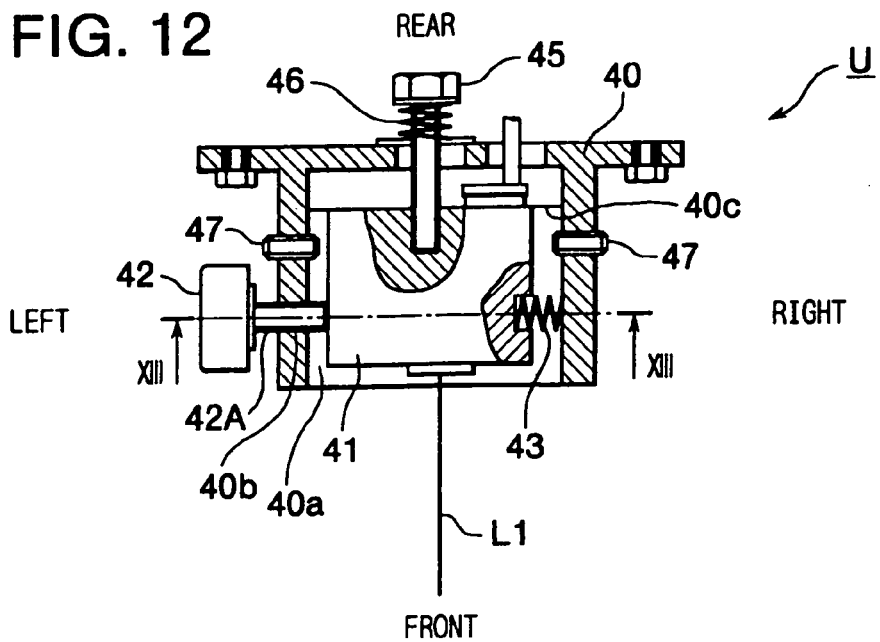
FIG. 12 is a cross-sectional view showing a laser unit according to the first embodiment, taken along line XII-XII of FIG. 11.

As shown in FIG. 8, the laser unit U includes a support member 40 and a rectangular-shaped laser generator 41. The support member 40 is fixed to the front surface of the holder 10 and houses the laser generator 41. As shown in FIG. 12, the support member 40 and the laser generator 41 define therebetween a rectangular housing space 40a. The laser generator 41 includes a light emitting portion 41a (FIG. 13) for emitting a laser light L1. According to the present embodiment, the light emitting portion 41a is positioned along an imaginary line extending from the blade edge 22a of the cutting blade 22. The laser generator 41 includes a switch (not shown) for starting drive of the light emitting portion 41a to emit the laser light L1.

The support member 40 supports the laser generator 41 in an orientation to direct at least a portion of the emitted laser light L1 directly beneath the blade edge 22a of the cutting blade 22, assuming that the cutter mechanism 20 is raised in its uppermost position as shown in FIG. 8. This configuration overcomes the shortcomings of the configuration described in U.S. Pat. No. 5,375,495, so that the laser light L1 irradiates the upper surface of the workpiece M without interference from the cutting blade 22. As a result, the operator can align the laser light L1 with the interior of left and right edges of the cutting width W2 in the manner shown in FIGS. 6 (a) and 6 (b).

A detailed explanation of the laser unit U according to the present embodiment will be described while referring to FIGS. 12 to 14. The laser unit U is configured to enable horizontal movement of the laser generator 41, so that the position where the laser light L1 falls incident on the workpiece M can be minutely adjusted. For example, when the width W2 of the cutting blade 22 is different from the width W1 of the laser light L1, the laser light L1 can be directed onto the workpiece as indicated in FIGS. 4 through 7 (b), that is, aligned with the interior or exterior of left or right edges of the cutting width W2. Because the laser generator 41 can be moved horizontally, the laser light L1 can be aligned with any position of the cutting width W2.

As shown in FIG. 12, a screw-hole portion 40b is formed at the left side surface of the support member 40. A screw portion 42A of a knob 42 is screwingly fitted in the screw-hole portion 40b. The tip of the knob 42 abuts against the left side surface of the laser generator 41. A compression spring 43 is disposed between the right side wall of the support member 40 and the right side surface of the laser generator 41. The compression spring 43 urges the laser generator 41 toward the knob 42, thereby removing any looseness in the fit between the knob 42 and the laser generator 41. As shown in FIGS. 12 and 14, a bolt 45 passes through the rear wall of the support member 40 and is screwingly fixed into a female screw opened in the laser generator 41. A compression spring 46 is disposed between the bolt 45 and the support member 40 to pull the laser generator 41 rearward. Two stoppers 47 are provided, one screwingly penetrating through each of the left and right side walls of the support member 40. When the laser generator 41 is moved a certain distance either leftward or rightward, the tip of the corresponding stopper 47 abuts the wall of the laser generator 41. In this way, the stoppers 47 restrict horizontal movement of the laser generator 41 within in a predetermined range.

Figure 13:
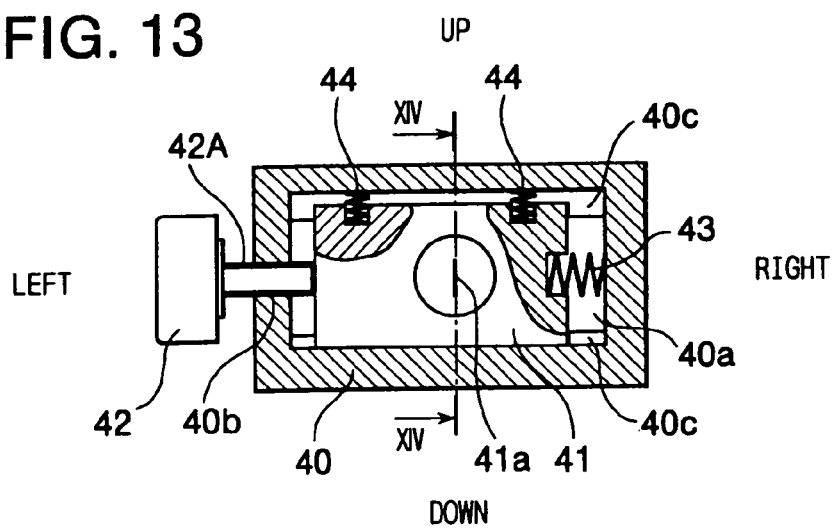
FIG. 13 is a cross-sectional view taken along line XIII-XIII of FIG. 12.
Figure 14:
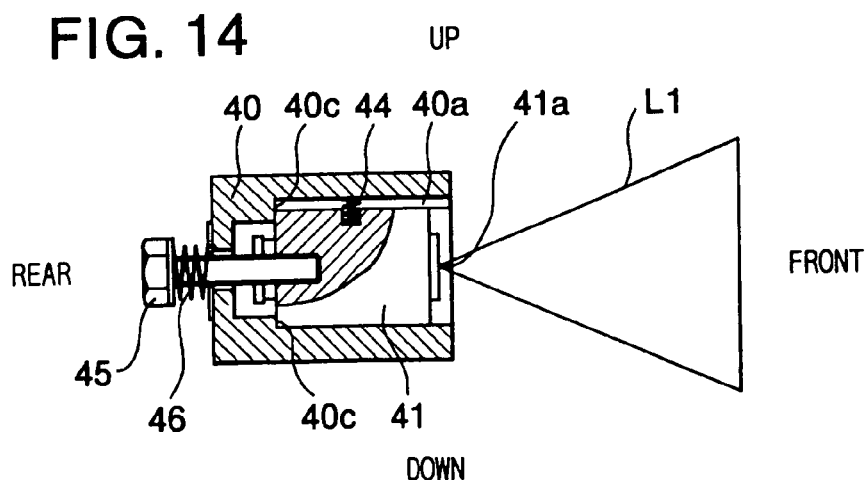
FIG. 14 is a cross-sectional view taken along line XIV-XIV of FIG. 13.
Figure 15:
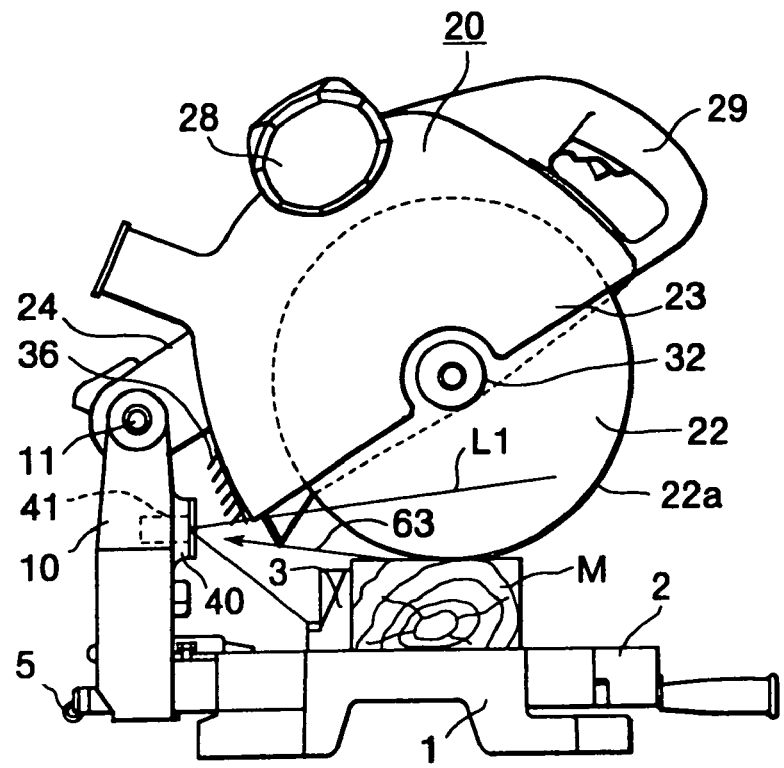
FIG. 15 is a side view showing a modification to the cutter of the first embodiment, the modification including a cleaning mechanism.

As shown in FIG. 13, left and right compression springs 44 are supported between the upper surface of the laser generator 41 and the upper wall of the support member 40, to urge the laser generator 41 downward. A protruding abutment surface 40c is provided in the rear internal side of the support member 40, that is, in the rectangular housing space 40a, in abutting confrontation with the rear surface of the laser generator 41.

With this configuration, when the knob 42 is rotated to screwingly move leftward as viewed in FIG. 12, the laser generator 41 is slid horizontally leftward by restorative force of the compression spring 43. On the other hand, when the knob 42 is rotated to screwingly move rightward, the laser generator 41 will be pressed by the knob 42 and slid horizontally rightward against the urging force of the compression spring 43. When the knob 42 is rotated once, the laser generator 41 will move by an amount equivalent to only the amount that the screw portion of the knob 42 moves horizontally, thereby enabling minute adjustment of the laser generator 41. At this time, the laser generator 41 is urged against the left, lower, and rear surfaces of the light emitting portion 41a by the compression springs 43, 44, 46 and the bolt 45, thereby removing any looseness between the support member 40 and the laser generator 41. This prevents the knob 42 from being unintentionally rotated by vibration and the like during operations, so the laser generator 41 will not be unintentionally moved.

Figure 4:
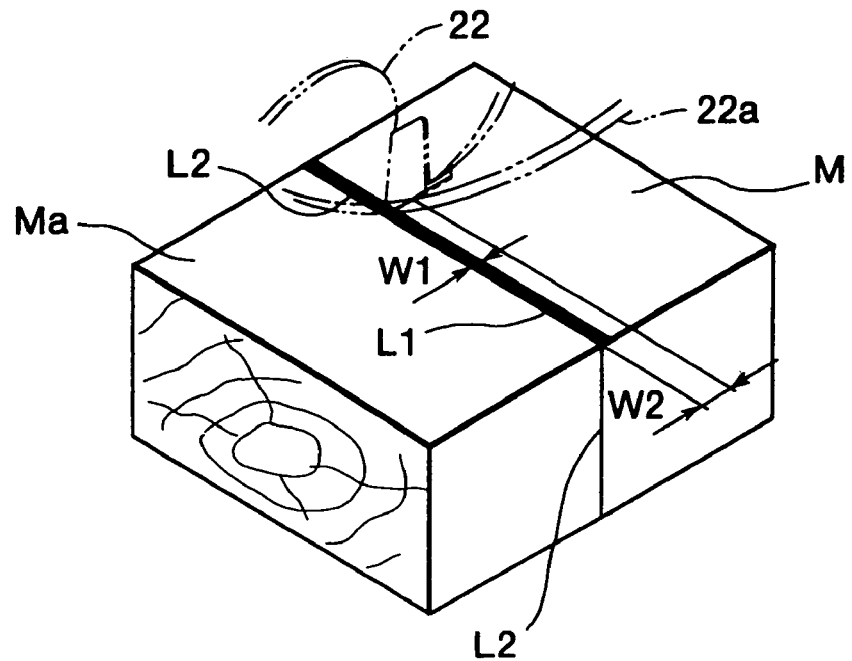
FIG. 4 is perspective view showing a workpiece irradiated in a conceivable manner by a laser light along an inner edge of a width to be cut.
Figure 5:
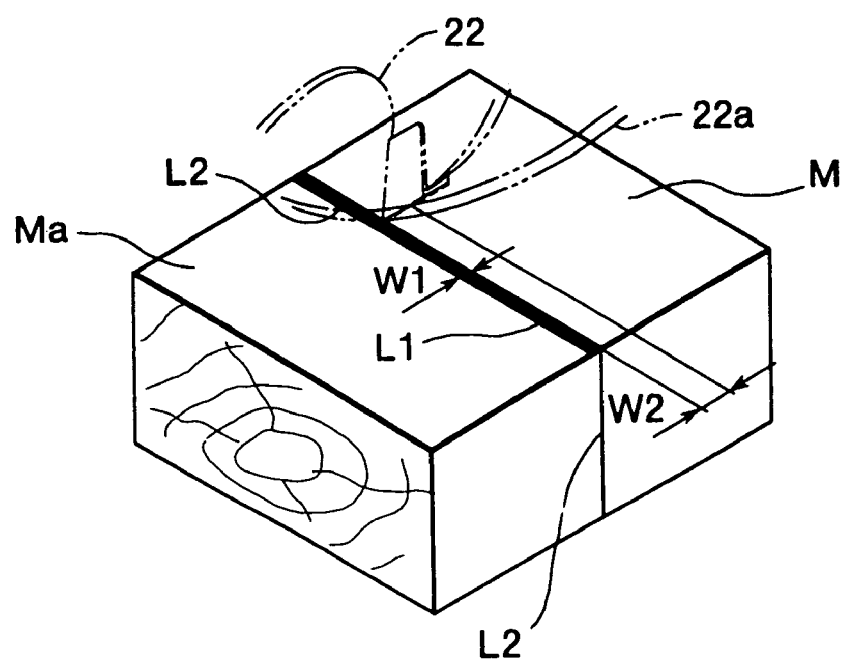
FIG. 5 is perspective view showing a workpiece irradiated in a conceivable manner by a laser light along an outer edge of a width to be cut.
Figure 6A:
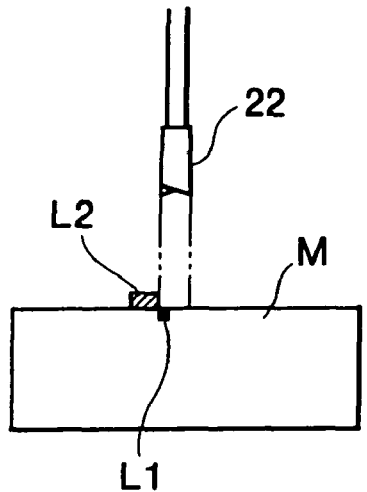
FIG. 6 (a) is a schematic view showing a workpiece irradiated in a conceivable manner by a laser light along an inner left edge of a width to be cut.
Figure 6B:
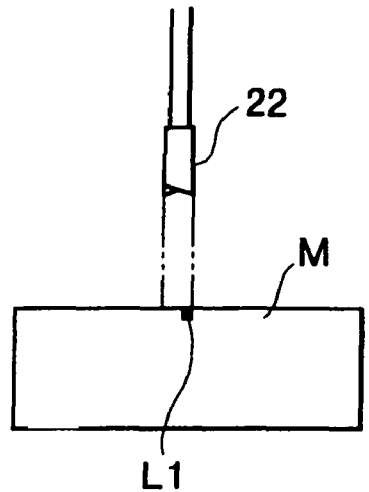
Figure 7A:
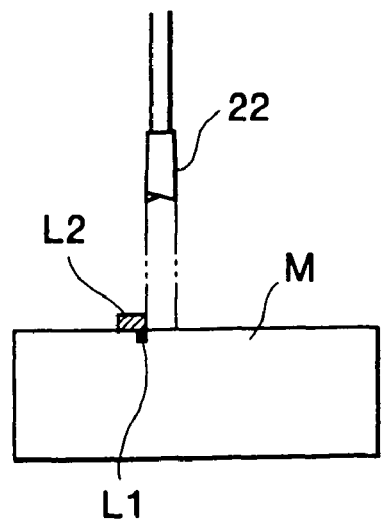
FIG. 7 (a) is a schematic view showing a workpiece irradiated in a conceivable manner by a laser light along an outer left edge of a width to be cut.
Figure 7B:
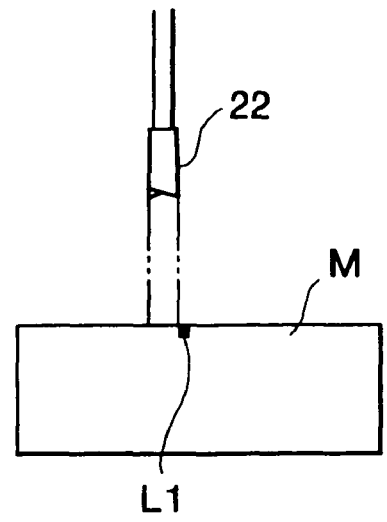

Next, cutting operations using the cutter D1 according to the present embodiment will be explained. First, the user draws a line L2 on the upper surface of the workpiece M as shown in FIG. 4. For this explanation it will be assumed that the user wants to use the left-hand portion Ma of the workpiece M after cutting the workpiece M, and wishes to retain the line L2 on the portion Ma. In this case, when the laser light L1 is to be aligned with the interior of the left edge of the cutting width W2 as shown in FIG. 6 (a), then the left edge of the laser light L1 is aligned with the right edge of the line L2. On the other hand, when the laser light L1 is to be aligned exterior of the left edge of the cutting width W2 as shown in FIG. 7 (a), then as shown in FIG. 5, the operator aligns the right edge of the laser light L1 with the right edge of the line L2. Then, the user grasps the handle 29 of the cutter mechanism 20 and swings the cutter mechanism 20 downward so that the rotating blade cuts through the workpiece M.

Figure 16:
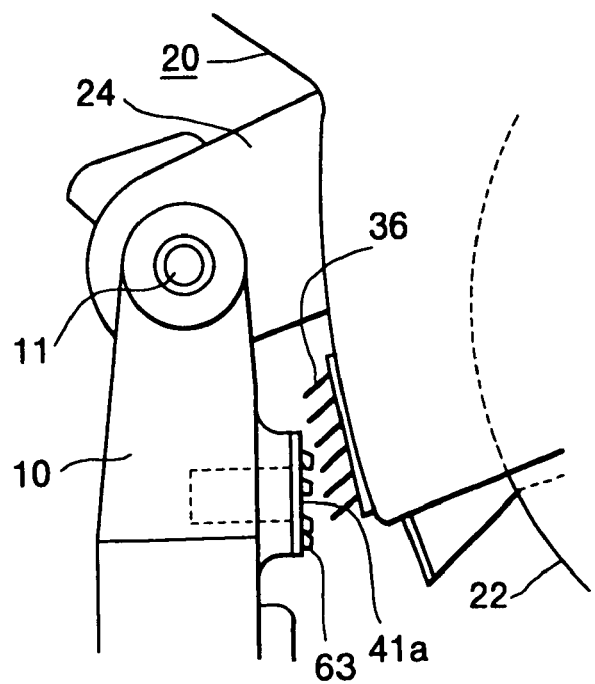
FIG. 16 is an enlarged view showing the cleaning mechanism of FIG. 15.
Figure 17:
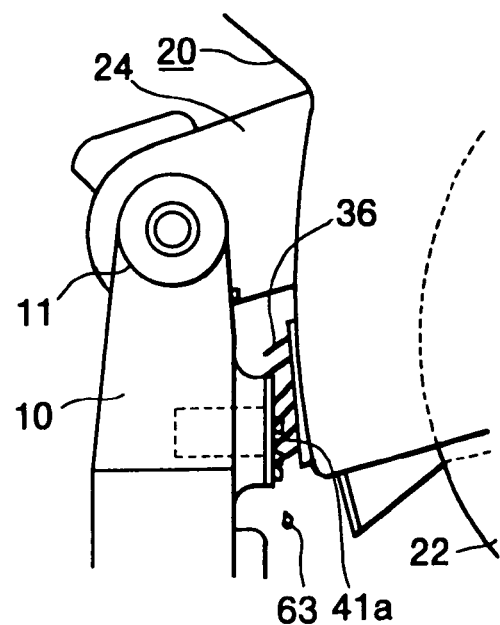
FIG. 17 is an enlarged view showing a brush of the cleaning mechanism moving into contact with a light emitting portion of the laser generator.
Figure 18:
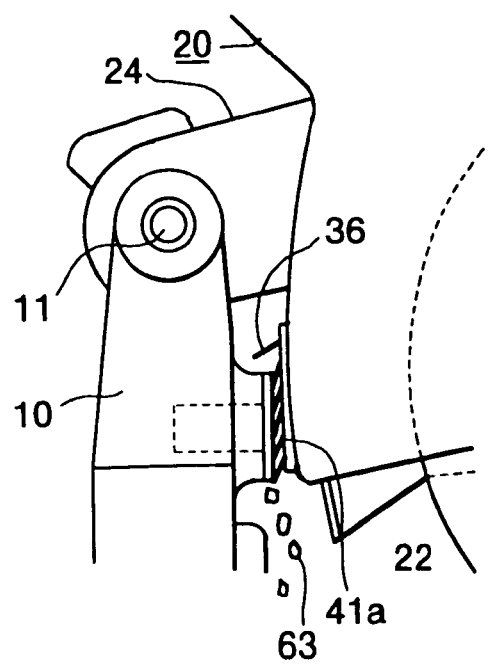
FIG. 18 is an enlarged view showing the brush cleaning sawdust off the light emitting portion.

Next, a cleaning mechanism for cleaning the laser generator 41 will be explained while referring to FIGS. 15 to 18. As a modification to the first embodiment, the cleaning mechanism is provided in order to clean the surface of the light emitting portion 41a of the laser generator 41. That is, during the process of cutting through the workpiece M, saw dust 63 flies toward the light emitting portion 41a of the laser generator 41 in the direction indicated by an arrow in FIG. 15. In some cases, the sawdust 63 will cling to the light emitting portion 41a as shown in FIG. 16. To remove any sawdust 63 that clings to the light emitting portion 41a, a brush 36 is attached to the lower rear portion of the cutter mechanism 20. The brush 36 is formed from a plurality of resilient fibers, such as nylon fibers. When the cutter mechanism 20 is lowered, the brush 36 approaches the light emitting portion 41a as shown in FIG. 16 until the brush 36 contacts the light emitting portion 41a as shown in FIG. 17. When the brush 36 presses further against the light emitting portion 41a, the sawdust 63 clinging to the light emitting portion 41a is swept away as shown in FIG. 18. In this way, the saw dust 63 can be removed from the light emitting portion 41a so that the cutting position can be constantly, accurately irradiated by the laser light L1 from the light emitting portion 41a.

Next, the second embodiment of the present invention will be described while referring to FIGS. 19 and 20. The cutter according to the second embodiment has the same configuration as the cutter of the first embodiment, except that the laser unit U of the first embodiment is replaced with a laser unit U2 of the second embodiment. Therefore, only the laser unit U2 according to the second embodiment will be described hereinafter.

Figure 19:
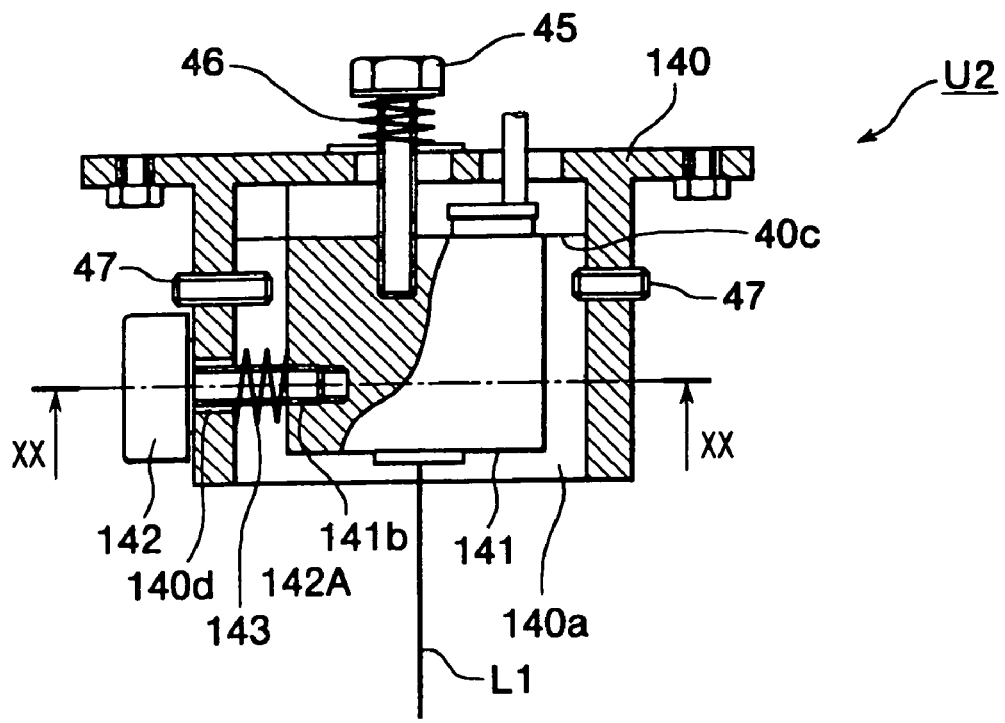
FIG. 19 is a cross-sectional view showing a laser unit according to a second embodiment of the present invention.
Figure 20:
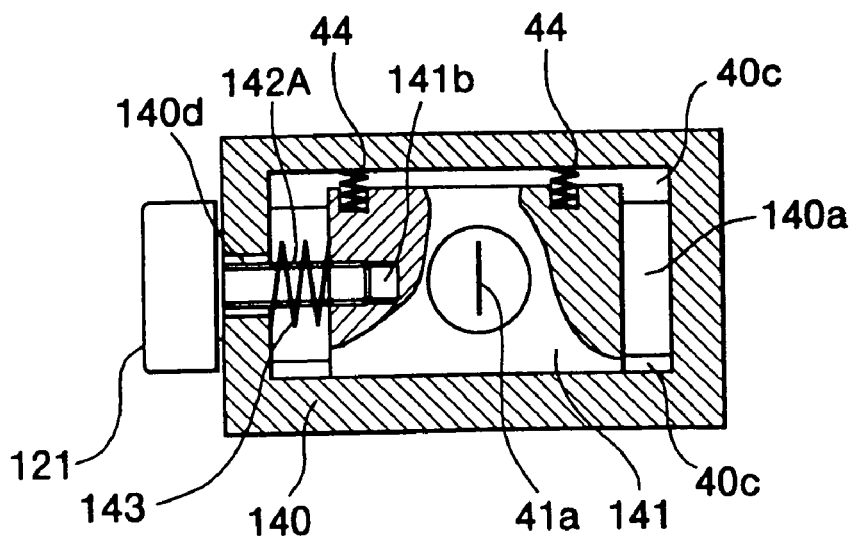
FIG. 20 is a cross-sectional view taken along line XX-XX of FIG. 19.

As shown in FIG. 19, a hole 140d is formed in the left wall of a support member 140. A knob 142 penetrates through the left wall into the rectangular housing space 40a. A screw portion 142A of the knob 142 is screwingly fitted in a female screw portion 141b opened in the side surface of the laser generator 141. A compression spring 143 is disposed on the shaft of the knob 142 at a position between the left side wall of the laser generator 141 and the left wall of the support member 140. The compression spring 143 urges the laser generator 141 rightward to remove any looseness between the laser generator 141 and the compression spring 143. The laser generator 141 can be slid horizontally either rightward or leftward by rotating the know 142. Other configuration of the laser unit U2 is as same as in the laser unit U, so further description will be omitted. Cutting operations according to the configuration of the second embodiment are also the same as those described for the first embodiment.

Next, the third embodiment will be described while referring to FIG. 21. The cutter according to the third embodiment has the same configuration as the cutter of the first embodiment, except that the laser unit U is replaced with a laser unit U3. Therefore, only the laser unit U3 according to the third embodiment will be explained.

Figure 21:
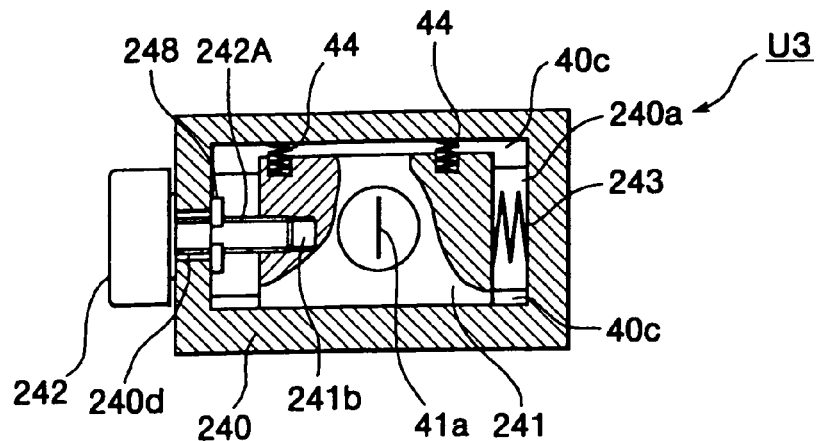
FIG. 21 is a cross-sectional view showing a laser unit according to a third embodiment of the present invention.

As shown in FIG. 21, a hole 240d is formed in the left wall of a support member 240. A knob 242 penetrates through the left wall into a rectangular space 240a of the support member 240. A ring 248 is rotatably engaged with the knob 242 at a right surface of the left wall of the support member 240, so that the knob 242 is axially immovable relative to the support member 240. Alternatively, the ring 248 can be fixed to the right surface of the left wall of the support member 240, and the knob 242 can be loosely supported by the ring 248, so as to prevent the knob 242 from being released from the support member 240.

A screw portion 242A of the knob 242 is screwingly fitted into the female screw portion 241b in the left side of the laser generator 241. A compression spring 243 is supported between the right side wall of the laser generator 241 and the right side wall of the support member 240. The compression spring 243 urges the laser generator 241 toward the knob 242 so that looseness between the laser generator 241 and the knob 242 is removed. Because the ring 248 restricts movement of the knob 242, the laser generator 241 itself slides leftward or rightward in the horizontal direction when the knob 242 is rotated. Other configuration of the laser unit U3 is same as for the laser unit U described in the first embodiment, so further explanation will be omitted. Also, the cutting operations using the cutter of the third embodiment are performed in the same manner as described for the first embodiment.

Next, the fourth embodiment will be described while referring to FIG. 22. The cutter according to the fourth embodiment is the same as described for the first embodiment, except that the laser unit U is replaced with a laser unit U4. Therefore, only the laser unit U4 according to the fourth embodiment will be described hereinafter.

Figure 22:
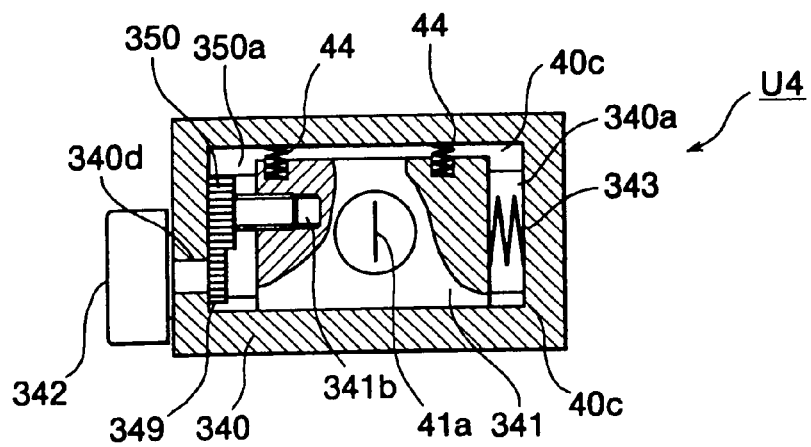
FIG. 22 is a cross-sectional view showing a laser unit according to a fourth embodiment of the present invention.

As shown in FIG. 22, a hole 340d is formed in the left wall of a support member 340. A knob 342 passes through the hole 340d into a rectangular space 340a in the support member 340. The knob 342 rotates idly in the hole 340d. A pinion 349 is connected to the inward-facing tip of the knob 342, with the pinion 349 positioned in the rectangular space 340a in abutment with the inner surface of the left wall of the support member 340. The pinion 349 rotates idly with idle rotation of the knob 342 in the hole 340d.

A gear 350 is meshingly engaged with the pinion 349. A horizontally extending screw shaft 350a is connected to the center of the gear 350. The screw shaft 350a is screwingly engaged in a female screw portion 341b in the left side surface of the laser generator 341. A compression spring 343 is supported between the right wall of the support member 340 and the laser generator 341. The compression spring 343 urges the laser generator 341 toward the gear 350, thereby eliminating any looseness between the gear 350 and the laser generator 341. When the knob 342 is rotated, the pinion 349 rotates the gear 350. As a result, the laser generator 341 slides leftward or rightward horizontally, depending on the direction of rotation of the knob 342. Other configuration of the laser unit U4 is the same as for the laser unit U of the first embodiment, so further explanation will be omitted. Also, the cutter according to the fourth embodiment cuts the workpiece M in the same manner as described for the first embodiment.

Figure 23:
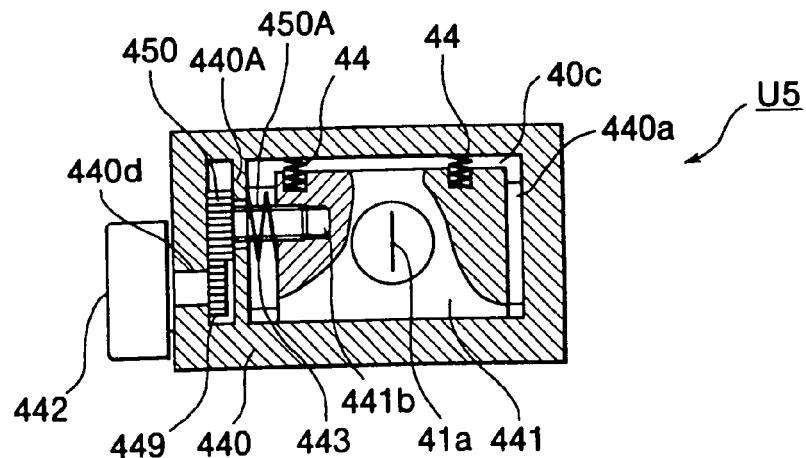
FIG. 23 is a cross-sectional view showing a laser unit according to a fifth embodiment of the present invention.

Next, the fifth embodiment of the present invention will be described while referring to FIG. 23. The cutter according to the fifth embodiment has the same configuration as the cutter of the first embodiment, except that the laser unit U is replaced with a laser unit U5. Accordingly, only the laser unit U5 according to the fifth embodiment will be described hereinafter.

A hole 440d is formed through the left wall of the support member 440, and a knob 442 penetrates through the hole 440d into the rectangular space 440a. A wall 440A is formed inside the support member 440. A pinion 449 is connected to the shaft tip of the knob 442, with the left wall of the support member 440 sandwiched between the pinion 449 and the knob 442. That is, the pinion 449 is positioned between the left wall of the support member 440 and the wall 440A, in abutment with the inner surface of the left wall of the support member 440.

A gear 450 is provided in meshing engagement with the pinion 449. The gear 450 is disposed between the left wall of the support member 440 and the wall 440A, in abutment with the inner surface of the left wall of the support member 440. A screw shaft 450A is attached to the center of the gear 450 and penetrates through the wall 440A into screwing engagement with a female screw portion 441b formed in the left side surface of the laser generator 441. A compression spring 443 is supported between the wall 440A and the left side surface of the laser generator 441, for urging the laser generator 441 in a direction away from the knob 442. With this configuration, when the knob 442 is rotated, the pinion 449 rotates the gear 450. The laser generator 441 slidingly moves leftward or rightward in the horizontal direction, depending on rotational amount and direction of the knob 442. Further, horizontal movement of the gear 450 is restricted by the wall 440A. Other configuration of the laser unit U5 is the same as for the laser unit U of the first embodiment, so further explanation will be omitted. Also, cutting operations performed by the cutter of the fifth embodiment is in a same manner as for the cutter of the first embodiment.

Figure 24:
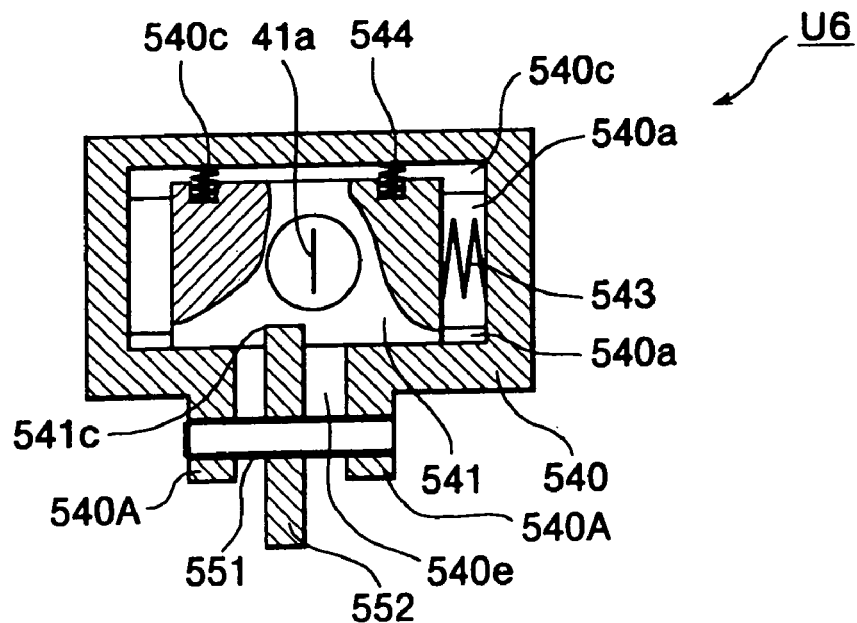
FIG. 24 is a cross-sectional view showing a laser unit according to a sixth embodiment of the present invention.

Next, a cutter according to the sixth embodiment will be described while referring to FIG. 24. The cutter according to the sixth embodiment has the same configuration as the cutter according to the first embodiment, except that the laser unit U of the first embodiment is replaced with a laser unit U6. Accordingly, only the laser unit U6 of the sixth embodiment will be described hereinafter.

An open portion 540e is formed in the lower center of the support member 540. Right and left hand walls 540A, 540A extend downward from support member 540 on either side of the open portion 540e. A screw bar 551 is fixed between the walls 540A, 540A in a horizontal orientation to extend across the open portion 540e. A ring screw 552 is screwingly fitted on the outer periphery of the screw bar 551. The ring screw 552 can be moved leftward or rightward between the walls 540A, 540A by rotating the screw ring 552 around the screw bar 551. The outer peripheral edge of the ring screw 552 is fitted in a groove 541c formed in the lower surface of the laser generator 541. A compression spring 543 is supported between right sides of the laser generator 541 and the support member 540. The compression spring 543 urges the laser generator 541 against the ring screw 552, thereby eliminating any looseness between the groove 541c of the laser generator 541 and the outer periphery of the ring screw 552. With this configuration, when the ring screw 552 is rotated, the laser generator 541 will slidingly move rightward or leftward in a horizontal direction in linking association with horizontal movement of the ring screw 552. As a modification, the screw bar 551 can be screwingly fitted with respect to the wall portions 540A, 540A of the support member 540, rather than fixedly fitted on the wall portions. In this case, the ring screw is fixed on the screw bar 551. With this modification, by rotating the screw bar 551, the ring screw is moved leftward and rightward in linking association with the movement of the screw bar 551, so that the laser generator 541 also slidingly moves leftward and rightward in the horizontal direction depending on rotational amount of the screw bar 551.

Next, the seventh embodiment of the present invention will be described while referring to FIGS. 25 to 29. The cutter according to the seventh embodiment has substantially the same configuration as the cutter of the first embodiment, except that the laser unit U is replaced with a laser unit U7. Accordingly, the following explanation for the seventh embodiment will be provided for the laser unit U7 only. It should be noted that the laser unit U7 is configured to enable adjustment of orientation of the laser generator 641 in both horizontal and vertical directions.

Figure 25:
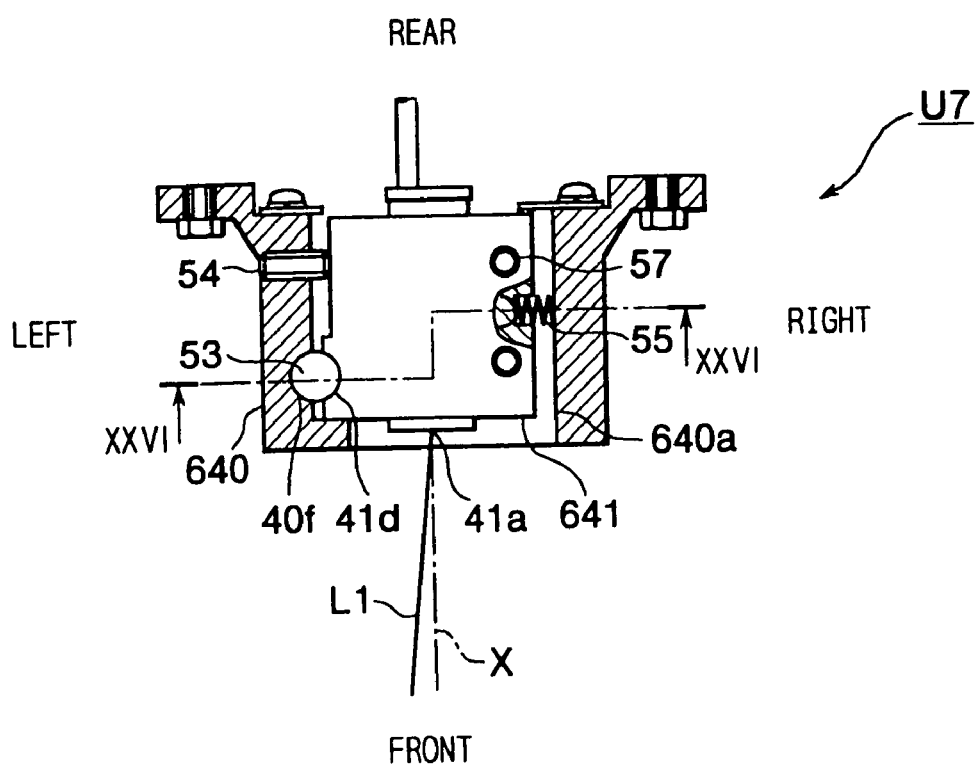
FIG. 25 is a cross-sectional view showing a laser unit according to a seventh embodiment of the present invention.

As shown in FIG. 25, a hemispherical indentation 40f is formed in the inner surface of the left sidewall of a support member 640, near the front of the support member 640. Also, a hemispherical indentation 41d is formed in a laser generator 641 at a position corresponding to the hemispherical indentation 40f, that is, in the outer left side surface of the laser generator 641, near the front of the laser generator 641. A ball 53 is supported between the hemispherical indentations 40f, 41d. The laser generator 641 can be freely pivoted within the rectangular space 640a about the ball 53. That is, the ball 53 serves as a pivot fulcrum and the indentations 40f, 41d serve as pivot fulcrum bearings.

A first stopper 54 is screwingly fitted in the rear portion of the left wall of the support member 640. The tip of the first stopper 54 abuts against the left surface of the laser generator 641, at a position near the rear of the laser generator 641. A compression spring 55 is supported between the right surface of the laser generator 641 and the right wall of the support member 640. The compression spring 55 urges the laser generator 641 toward the first stopper 54.

Figure 26:
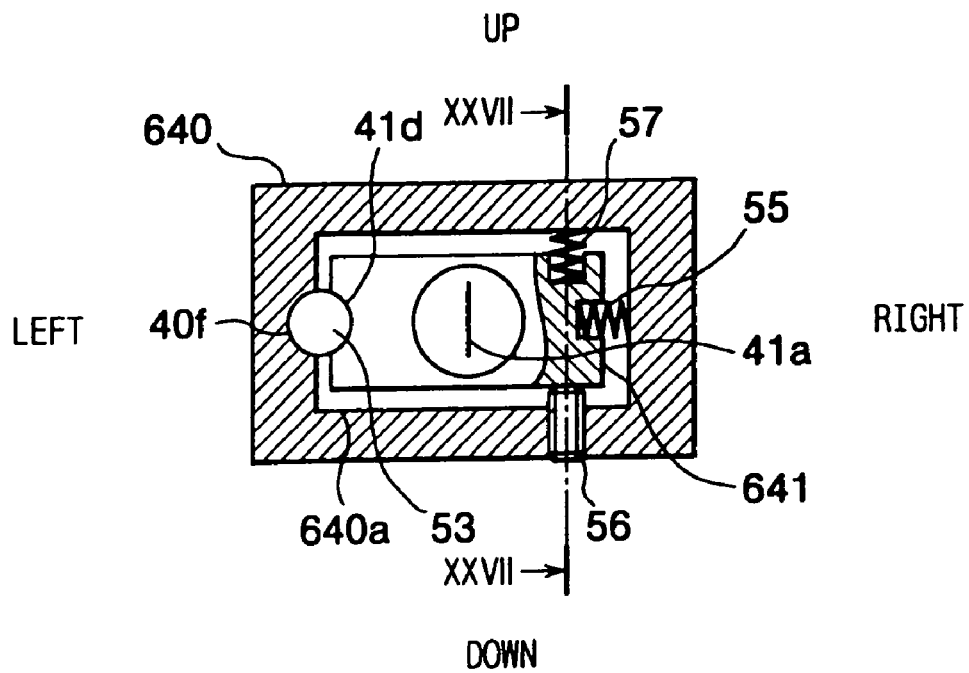
FIG. 26 is a cross-sectional view taken along line XXVI-XXVI of FIG. 25.
Figure 27:
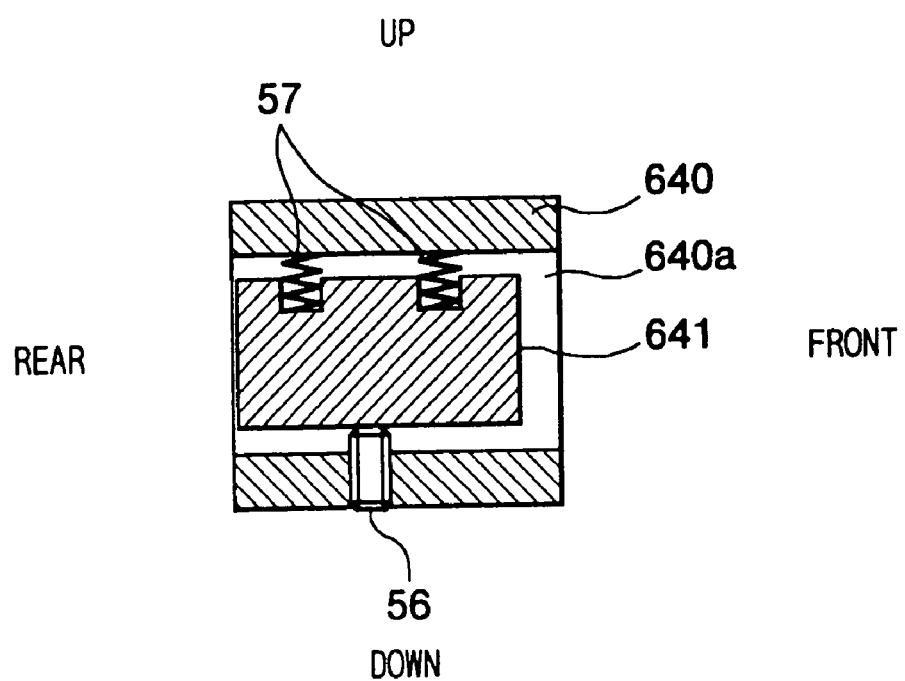
FIG. 27 is a cross-sectional view taken along line XXVII-XXVII of FIG. 26.

As shown in FIGS. 26 and 27, a second stopper 56 is screwingly fitted in the lower wall of the support member 640. The second stopper 56 is positioned near the right side wall of the support member 640 as shown in FIG. 26, that is, opposite from the ball 53 with respect to the leftward and rightward directions, and also in the substantial center of the support member 640 with respect to the frontward and rearward directions as shown in FIG. 27. The tip of the second stopper 56 abuts against the lower surface of the laser generator 641. As shown in FIG. 27, two compression springs 57 are disposed between the upper surface of the laser generator 641 and the upper wall of the support member 640 on the opposite side of the laser generator 641 from the second stopper 56. The compression springs 57 urges the laser generator 641 toward the second stopper 56. One of the compression springs 57 is disposed to the front of the second stopper 56 and the other is disposed to the rear of the second stopper 56 in order to maintain balance of the laser generator 641.

With this configuration, when the first stopper 54 is rotated and moved rightward, the tip of the first stopper 54 presses against the rear edge portion of the left side surface of the laser generator 641 so that the laser generator 641 pivots about the ball 53 in the clockwise direction as viewed in FIG. 25. As a result, the laser light L1 will tilt to the left as viewed in FIG. 25. When the first stopper 54 is rotated once, the laser generator 641 will move by an amount equivalent to the movement amount of the screw portion of the first stopper 54. As a result, the laser generator 641 can be moved by extremely small amounts. On the other hand, when the first stopper 54 is moved leftward, restorative force of the compression spring 55 will pivot the laser generator 641 about the ball 53 in the counterclockwise direction as viewed in FIG. 25. As a result, the laser light L1 will tilt to the right as viewed in FIG. 25. In the example shown in FIG. 25, to align the laser light L1 with a horizontal reference line X, the first stopper 54 is rotated to move leftward until the laser light L1 is aligned with the horizontal reference line X. Once alignment has been achieved, rotation of the first stopper 54 is stopped. This enables the position where the laser light L1 falls incident on the workpiece M to be adjusted in the horizontal direction.

When the second stopper 56 is rotated to move upward, then the tip of the second stopper presses against the right-hand portion of the lower surface of the laser generator 641, thereby pivoting the laser generator 641 around the ball 53 in the counterclockwise direction as viewed in FIG. 26. As a result, the emitted laser light L1 will rotate counterclockwise as viewed in FIG. 28 (b). On the other hand, when the second stopper 56 is rotated to move downward, then restorative force of the compression spring 57 will rotate the laser generator 641 in the clockwise direction as viewed in FIG. 26. As a result, the emitted laser light L1 will rotate clockwise as viewed in FIG. 28 (b). When the second stopper 56 is rotated once, the laser generator 641 will move only by an amount equivalent to the axial movement of the stopper 56 caused by the screwing movement. This enables minute positional adjustment of the laser generator 641 into alignment with a vertical reference line Y. In the example shown in FIGS. 28 (a) and 28 (b), the second stopper 56 is rotated to move downward to align the laser light L1 with the vertical reference line Y. Once the laser light L1 and the reference line Y have been aligned in parallel with each other, then rotation of the second stopper 56 is stopped. In this way, the laser light L1 can be set into alignment with a vertical reference line Y.

Figure 29:
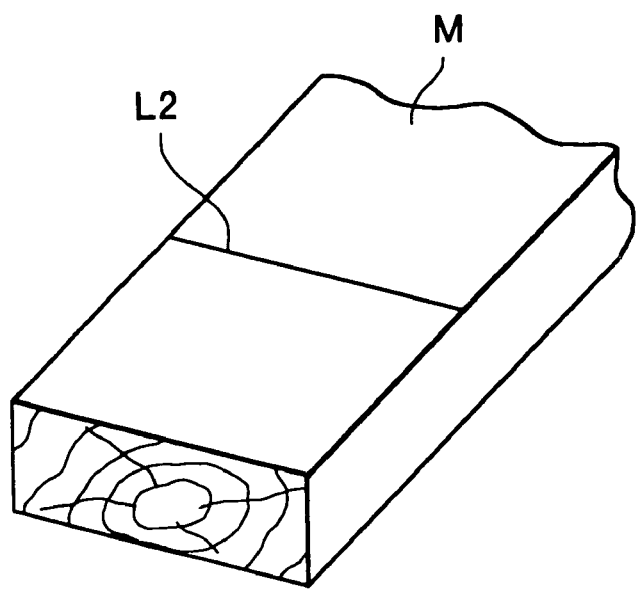
FIG. 29 is a schematic view showing a workpiece with the location to be cut indicated by a drawn line.

With this configuration, the laser light L1 from the laser generator 641 indicates the cutting position on the workpiece M where the cutting blade 22 will cut the workpiece M when the cutter mechanism 20 is swung downward. Before cutting the workpiece M, the operator draws a line L2 indicating a desired cutting position on the surface of the workpiece M as shown in FIG. 29. Then, the user aligns the laser light L1 with the line L2. By aligning the laser light L1 with the line L2 in this manner, the cutting blade 22 will also be aligned with the line L2. The user then energizes the motor 25 to drive rotation of the cutting blade 22. Then, the operator grasps the handle 29 of the cutter mechanism 20 and lowers the cutter mechanism 20 downward, thereby cutting the workpiece M. It is desirable that the position desired to be cut indicated by the line L2 be aligned as accurately as possible with the actual position cut. Therefore, it is extremely desirable that the position to be cut by the cutting blade 22 be properly aligned with the laser light L1.

Next, the eighth embodiment of the present invention will be described while referring to FIGS. 30 to 32. The cutter of the eighth embodiment has substantially the same configuration as the cutter of the seventh embodiment, except that the laser unit U7 is replaced with a laser unit U8 of the eighth embodiment. Accordingly, only the laser unit U8 of the eighth embodiment will be described in the following text.

Figure 30:
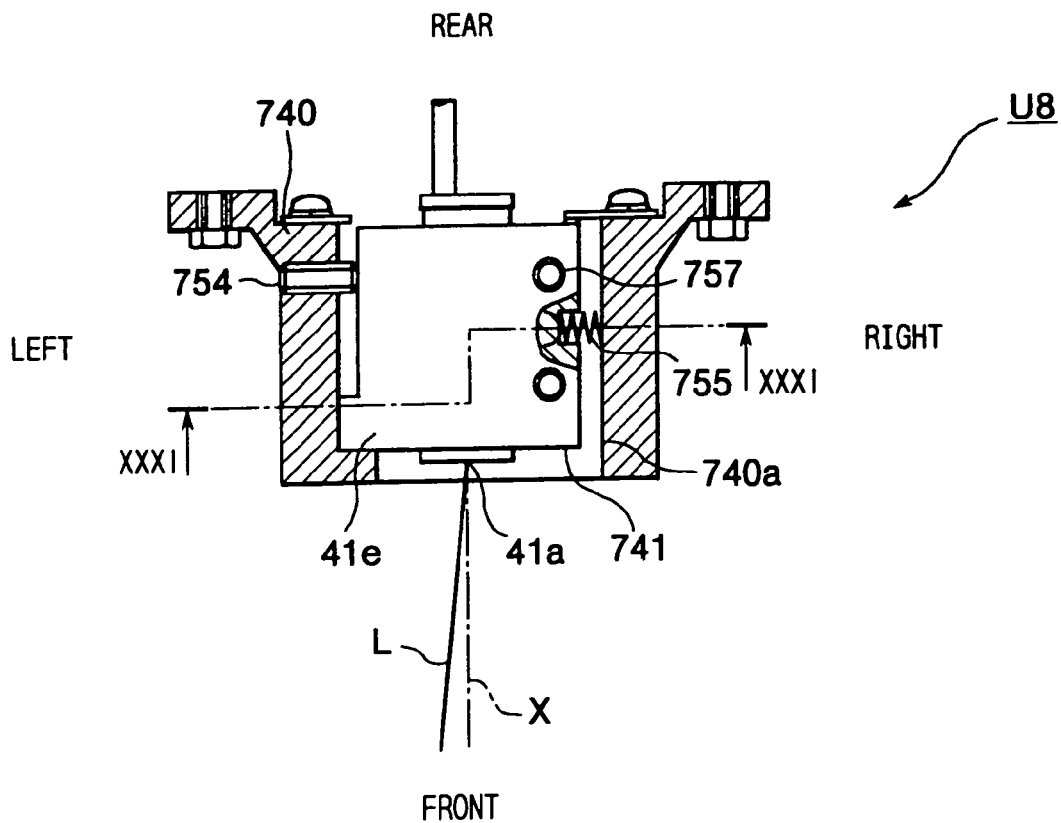
FIG. 30 is a cross-sectional view showing a laser unit according to an eighth embodiment of the present invention.
Figure 31:
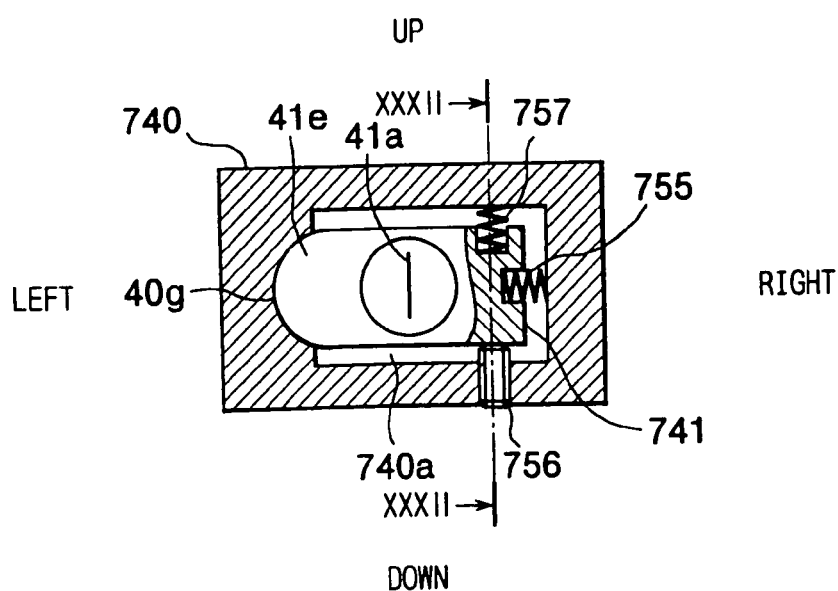
FIG. 31 is a cross-sectional view taken along line XXXI-XXXI of FIG. 30.

As shown in FIGS. 30 and 31, an arc-shaped indentation 40g is formed in the front edge at the inner surface of the left wall of the support member 740. An arc-shaped protruding portion 41e, which corresponds to the shape of the arc-shaped indentation 40g, is formed near the front of the left surface of the laser generator 741. With this configuration, the laser generator 741 can be freely pivoted around the arc-shaped protruding portion 41e within the space 740a. A first stopper 754 is screwingly engaged in the left sidewall of the support member 740 at a position to the rear of the arc-shaped indentation 40g. The tip of the first stopper 754 abuts against a rearward position on the left side of the laser generator 741. A compression spring 755 for urging the laser generator 741 towards the first stopper 754 is supported between the right surface of the laser generator 741 and the support member 740.

Figure 32:
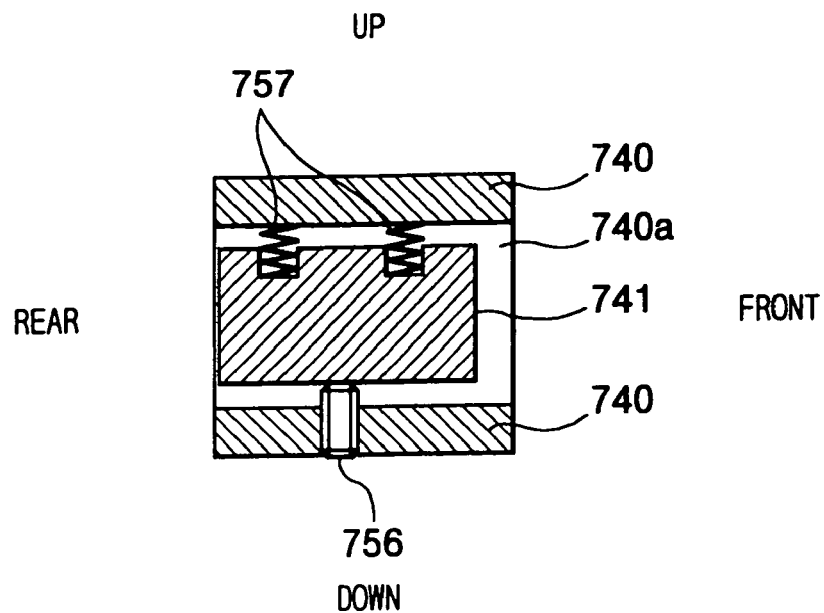
FIG. 32 is a cross-sectional view taken along line XXXII-XXXII of FIG. 31.

As shown in FIGS. 31 and 32, a second stopper 756 is screwingly fitted in the lower side of the support member 740, with the tip of the second stopper 756 in abutment against the lower surface of the laser generator 741. As shown in FIG. 31, the second stopper 756 is located on the opposite side of the light emitting portion 41a than the arc-shaped indentation 40g and the arc-shaped protruding portion 41e in the leftward and rightward directions. That is, the second stopper 756 is positioned to the right side of the light emitting portion 41a. As shown in FIG. 32, the second stopper 756 is positioned substantially in the center of the support member 740 in the front and rear directions. Compression springs 757, 757 for urging the laser generator 741 against the second stopper 756 are supported between the upper surface of the laser generator 741 and the support member 740. The compression springs 757, 757 are disposed on the opposite side of the laser generator 741 than the second stopper 756. One of the compression springs 757 is disposed to the front of the second stopper 756 and one to the rear of the second stopper 756 in order to properly balance the laser generator 741.

With this configuration, the user rotates the first stopper 754 to move the first stopper 754 leftward or rightward in order to align the laser light L1 with the horizontal reference line X shown in FIG. 30. Accordingly, the laser generator 741 pivots clockwise or counterclockwise as viewed in FIG. 30 around the arc-shaped protruding portion 41e. The user stops rotating the first stopper 754 once the laser light L1 is aligned with the horizontal reference line X.

Figure 28A:
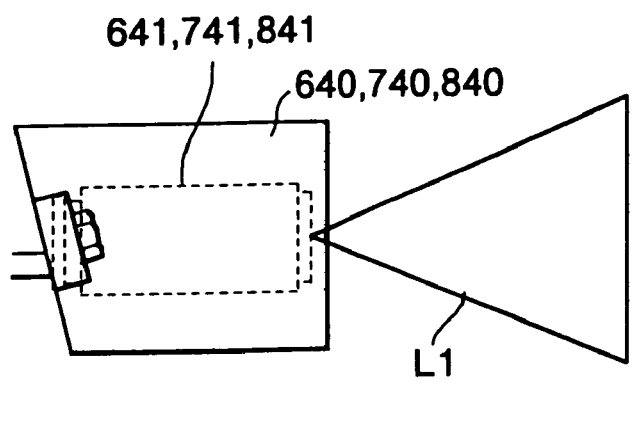
FIG. 28 (a) is a schematic view showing laser generators according to seventh, eighth, and ninth embodiments of the present invention emitting laser light.
Figure 28B:
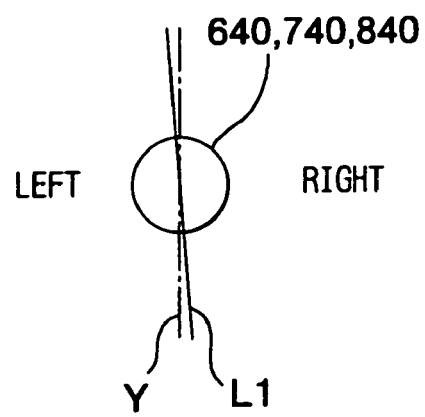

In order to align the laser light L1 emitted from the laser generator 741 as shown in FIG. 28 (a) into alignment with the vertical reference line Y shown in FIG. 28 (*b*), the operator rotates the second stopper 756 to move the second stopper 756 upward or downward. This will pivot the laser generator 741 in the corresponding clockwise or counterclockwise directions as viewed in FIG. 31 around the arc-shaped protruding portion 41*e*. The user stops rotating the second stopper 756 once the laser light L1 is aligned with the vertical reference line Y. Operation for cutting the workpiece M using the cutter of the eighth embodiment are the same as described for the seventh embodiment, so will be omitted here.

Next, a cutter according to the ninth embodiment of the present invention will be described while referring to FIGS. 33 to 35. The cutter according to the ninth embodiment has substantially the same configuration as the cutter according to the seventh embodiment, except that the laser unit U7 is replaced with a laser unit U9. Therefore, the following explanation will be provided for the laser unit U9 only.

Figure 33:
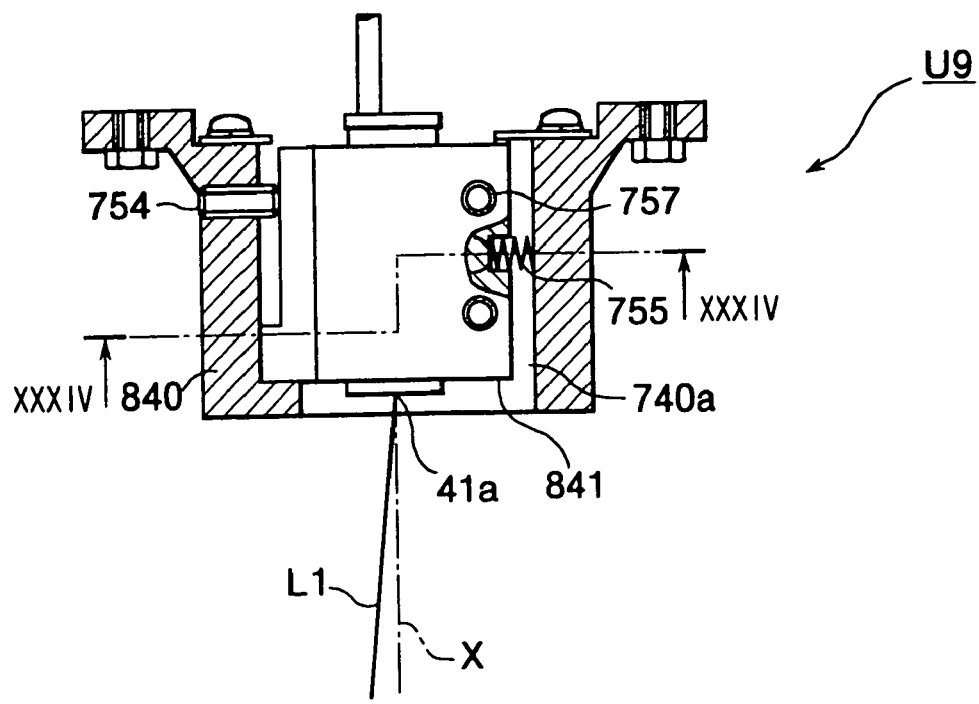
FIG. 33 is a cross-sectional view showing a laser unit according to a ninth embodiment of the present invention.
Figure 34:
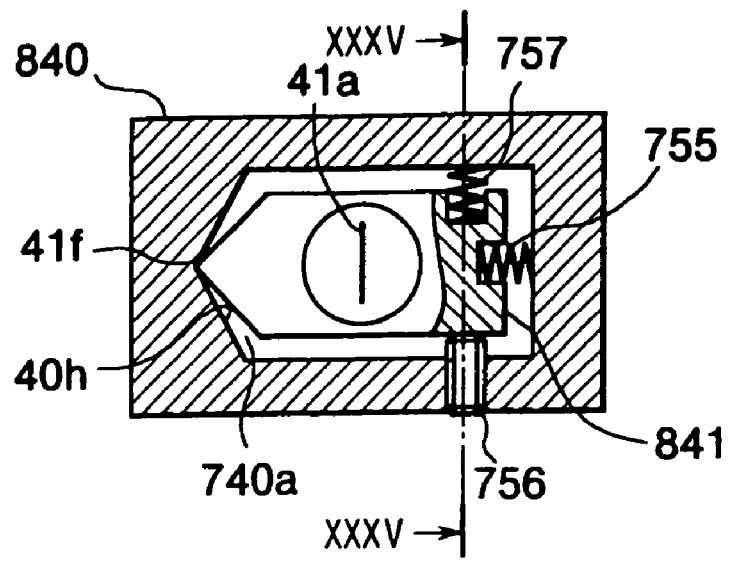
FIG. 34 is a cross-sectional view taken along line XXXIV-XXXIV of FIG. 33.
Figure 35:
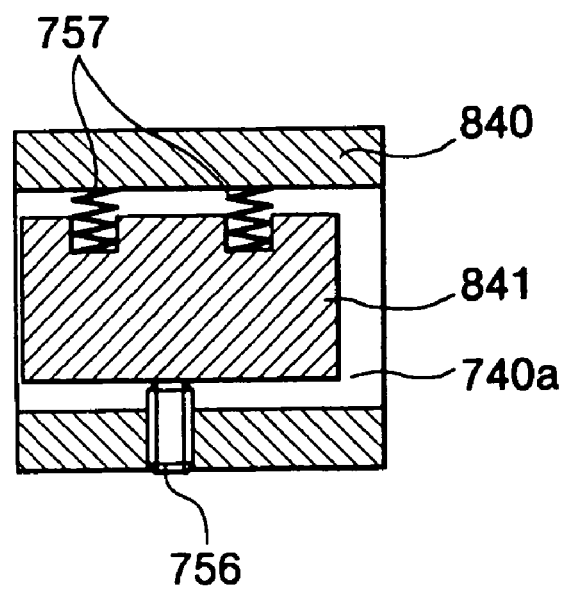
FIG. 35 is a cross-sectional view taken along line XXXV-XXXV of FIG. 34.

As shown in FIGS. 33 to 35, an angular indentation 40*h* is formed in the inner surface of the left wall of the support member 840, near the front of the support member 840. An angular protrusion 41*f* is formed at the left side of the laser generator 841, at a position corresponding to the position of the angular indentation 40*h*. Other configuration is the same as described for the eighth embodiment.

With the configurations of the eighth and ninth embodiments, the position where the laser light L1 falls incident on the workpiece M can be adjusted in precise alignment with vertical and horizontal reference lines X, Y in a manner similar to that described in the seventh embodiment, so that the laser light L1 can be properly and easily positioned into alignment with a desired cutting position.

Next, the tenth embodiment of the present invention will be described while referring FIGS. 36 to 39. The cutter according to the tenth embodiment has substantially the same configuration as the cutter described in the first embodiment, except that the laser unit U is replaced with a laser unit U10. The laser unit U10 is capable of adjusting the width W1 of the laser light L1. Therefore, the following explanation of the tenth embodiment will be provided only for the laser unit U10 and explanation of other configuration will be omitted.

Figure 36:
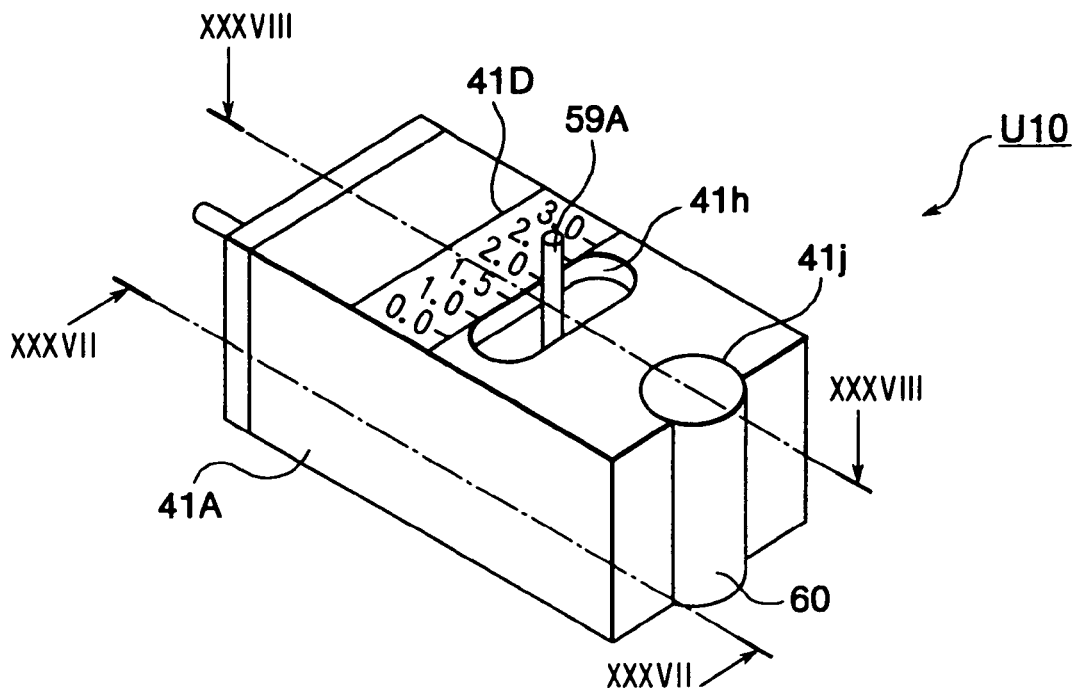
FIG. 36 is a perspective view showing a laser unit according to a tenth embodiment of the present invention.
Figure 37:
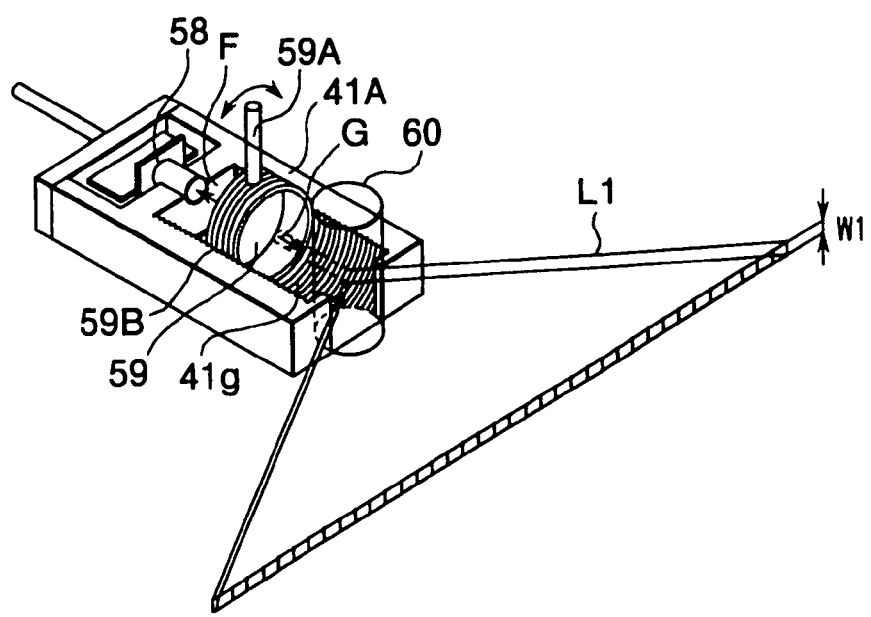
FIG. 37 is a cross-sectional view taken along line XXXVII-XXXVII of FIG. 36.

As shown in FIGS. 36 and 37, the laser unit U10 is provided with a laser case 41A, a laser light source 58, a convex lens 59, a lever 59A, and a cylindrical lens 60. A female screw portion 41*g* is formed along the interior surface of the laser case 41A. The convex lens 59 is held by an annular lens holder 59B, whose outer peripheral surface is formed with a male screw which is threadingly engaged with female screw portion 41*g*. Thus, the cylindrical lens 60 is rotatable within the laser case 41A as guided by the female screw portion 41*g*. The laser light source 58 is disposed to the rear of the convex lens 59. The convex lens 59 regulates the focal point of the laser light L1.

A cutout portion 41*j* is formed in the front surface of the laser case 41A. The cylindrical lens 60 is disposed in the cutout portion 41*j* at a position in front of the convex lens 59. The cylindrical lens 60 is partially exposed from the front surface of the laser case 41A through the cutout portion 41*j*. The cylindrical lens 60 refracts the laser light L1 passing through the convex lens 59 into parallel rays.

An elongated hole 41*h* is formed on the upper surface of the laser case 41A. The lever 59A is attached on the outer peripheral surface of the convex lens 59 and protrudes outward from the laser case 41A through the elongated hole 41*h*. The operator rotates the lever 59A to move the convex lens 59 either forward or rearward. A scale plate 41D that indicates various optional widths W1 for the laser light L1 is provided adjacent to the elongated hole 41*h* on the upper surface of the laser case 41A. The operator can determine the width W1 of the laser light L1 by reading the scale marked on the scale plate 41D.

Figure 38:
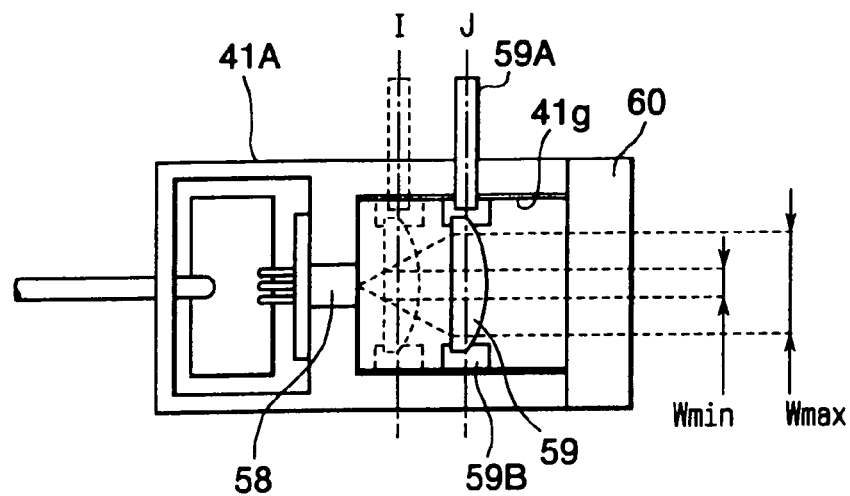
FIG. 38 is a cross-sectional view taken along line XXXVIII-XXXVIII of FIG. 36.

When the convex lens 59 moves in association with the pivoting movement of the lever 59A, the width W1 of the laser light L1 will change as shown in FIG. 38. That is to say, when the convex lens 59 moves rearward as indicated by arrow F in FIG. 37, then the width W1 of the laser light L1 will decrease. On the other hand, when the convex lens 59 moves forward as indicated by arrow G in FIG. 37, the width W1 will increase. According to the present embodiment, when the convex lens 59 is located at the position I as indicated in dotted line in FIG. 38, the laser light L1 will be emitted with a minimum width Wmin of 0.5 mm. On the other hand, when the convex lens 59 is located at position J indicated by solid line in FIG. 38, the laser light L1 will have a maximum width Wmax of 3.0 mm.

Figure 39:
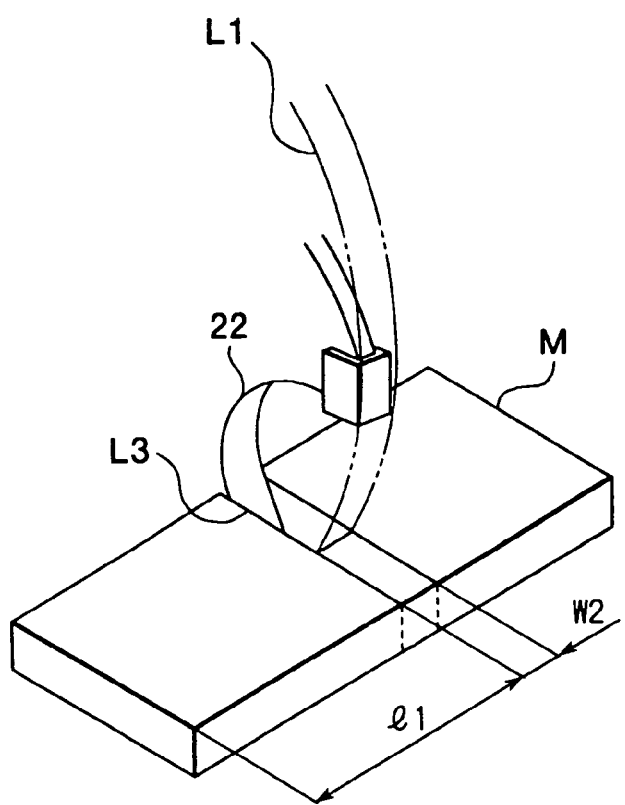
FIG. 39 is a perspective view showing cutting of a workpiece.

Next, an explanation will be provided for operations for using the above-described configuration to cut the workpiece M as shown in FIG. 39. Before starting operations to cut the workpiece M, the operator draws the line L3 on the workpiece M to indicate a desired length □l of the workpiece M to be used. When the cutting blade 22 has a width W2 of 0.5 mm (Wmin) then, the operator aligns the lever 59A to the mark on the scale plate 41D indicating 0.5 mm. As a result, the convex lens 59 will move to the position I so that the width W1 of the laser light L1 is set to 0.5 mm, which is the minimum possible width of the laser light L1 in this example. Next, the user moves the workpiece M until the laser light L1 and the line L3 are in alignment with each other. Next, after turning on the motor of the cutter, the user grasps the handle 29 and pivots the cutter mechanism 20 downward to cut the workpiece M with the cutting blade 22.

When the cutting blade 22 has a width W2 of, for example, 3.0 mm, which is the maximum width of the laser light L1, then the operator aligns the lever 59A with the mark indicating 3.0 mm on the scale plate 41D. As a result, the convex lens 59 will move to the position J so that the width W1 of the laser light L1 is set to 3.0 mm, which is the maximum possible width that the laser unit U10 can emit the laser light L1. Next, the operator moves the workpiece M until the laser light L1 and the line L3 are aligned with each other. Then the user cuts the workpiece M as described above.

Next, the eleventh embodiment of the present invention will be described while referring to FIGS. 40 and 41. The cutter according to the eleventh embodiment has the same configuration as the cutter described in the first embodiment, except that the laser unit U is replaced with a laser unit U11. Therefore, the following explanation will be provided for the laser unit U11 only.

Figure 40:
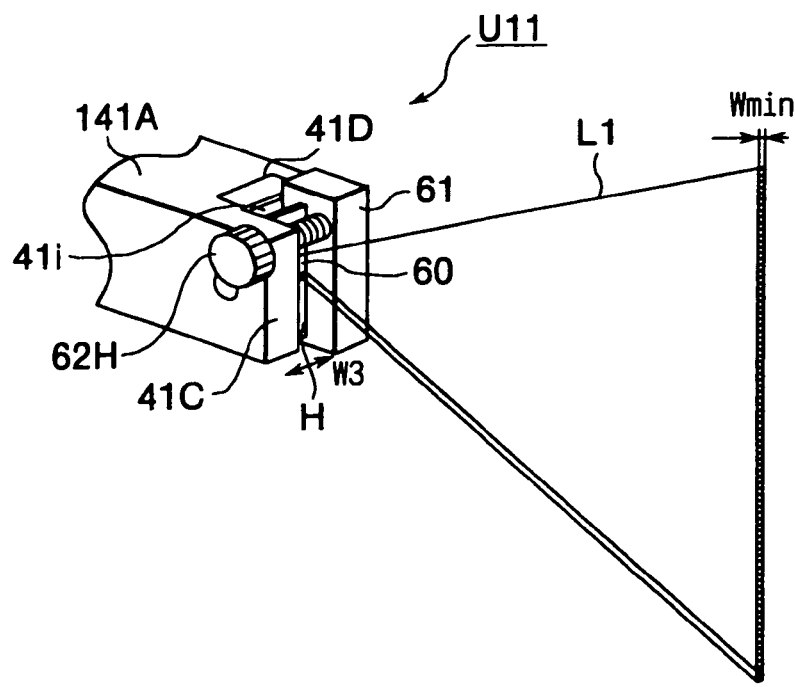
FIG. 40 is a perspective view showing a laser unit according to an eleventh embodiment of the present invention with laser light emitted therefrom adjusted to a minimum width.
Figure 41:
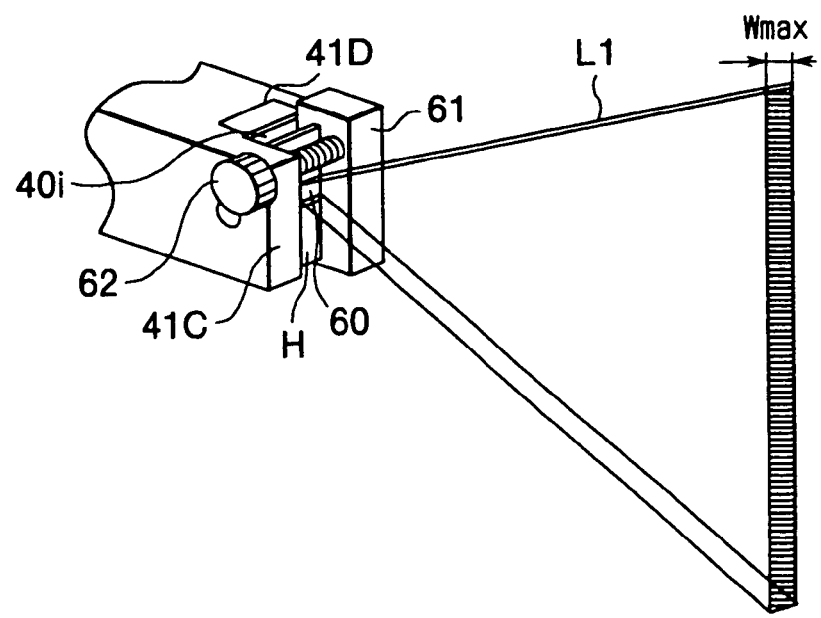
FIG. 41 is a perspective view showing the laser unit of FIG. 40 with laser light emitted adjusted to a maximum width.

As shown in FIGS. 40 and 41, the laser unit U11 includes a laser case 141A, a movement member 61, and a cylindrical lens 60. Also, although not shown in the drawings, a laser light source is provided in the laser case 141A. The cylindrical lens 60 is provided in front of the laser light source for refracting the laser light L1 into parallel rays. The cylindrical lens 60 protrudes from the front surface of the laser case 141A. A groove 41*i* is formed in the front part of the upper surface of the laser case 141A. The movement member 61 is mounted in the groove 41*i* at a position in front of the cylindrical lens 60. The movement member 61 is freely movable leftward and rightward horizontally as guided by the groove 41*i*. A protrusion portion 41C is formed in the front of the laser case 141A. A screw member 62 is screwingly fitted in the protrusion portion 41C and the movement member 61, with the base of the screw member 62 in abutment with the outer side of the protrusion portion 41C and the tip of the screw member 62 screwingly engaged in the inner surface of the movement member 61. A slit H is defined between the protrusion portion 41C and the movement member 61. With this configuration, when the screw member 62 is rotated, the movement member 61 moves leftward or rightward according to the rotation direction of the screw member 62, so that the width W3 of the slit H can be adjusted. A scale plate 41D including a marked scale is disposed at the front upper side of the laser case 141A, adjacent to the protrusion portion 41C and the movement member 61.

The laser light L1 that passes through the cylindrical lens 60 is emitted only through the slit H between the movement member 61 and the protrusion portion 41C. The laser light L1 other than that emitted from the slit H is blocked by the movement member 61 and the protrusion portion 41C. That is to say, when the movement member 61 is moved using the screw member 62, the width W3 of the slit H changes, so that the width W1 of the laser light L1 emitted through the slit H can be changed. When the movement member 61 moves leftward as viewed in FIG. 40, then the width W1 of the laser light L1 decreases as shown in FIG. 40. On the other hand, when the movement member 61 is moved to the right as viewed in FIG. 41, then the width W1 of the laser light L1 increases as shown in FIG. 41. By moving the movement member 61 while referring to the gauge marks on the scale plate 41D, the user can adjust the width W1 of the laser light L1. According to the present embodiment, the width W1 of the laser light L1 can be adjusted between 0.5 mm and 3.0 mm.

According to the eleventh embodiment, portions of the laser light L1 are blocked by the movement member 61 and the protrusion portion 41C so that compared to the configuration of the tenth embodiment, the contour of the laser light L1 is sharper. By matching the width W1 of the laser light L1 with width W2 of the cutting blade 22, alignment of the cutting position can be easily and accurately performed.

Figure 42:
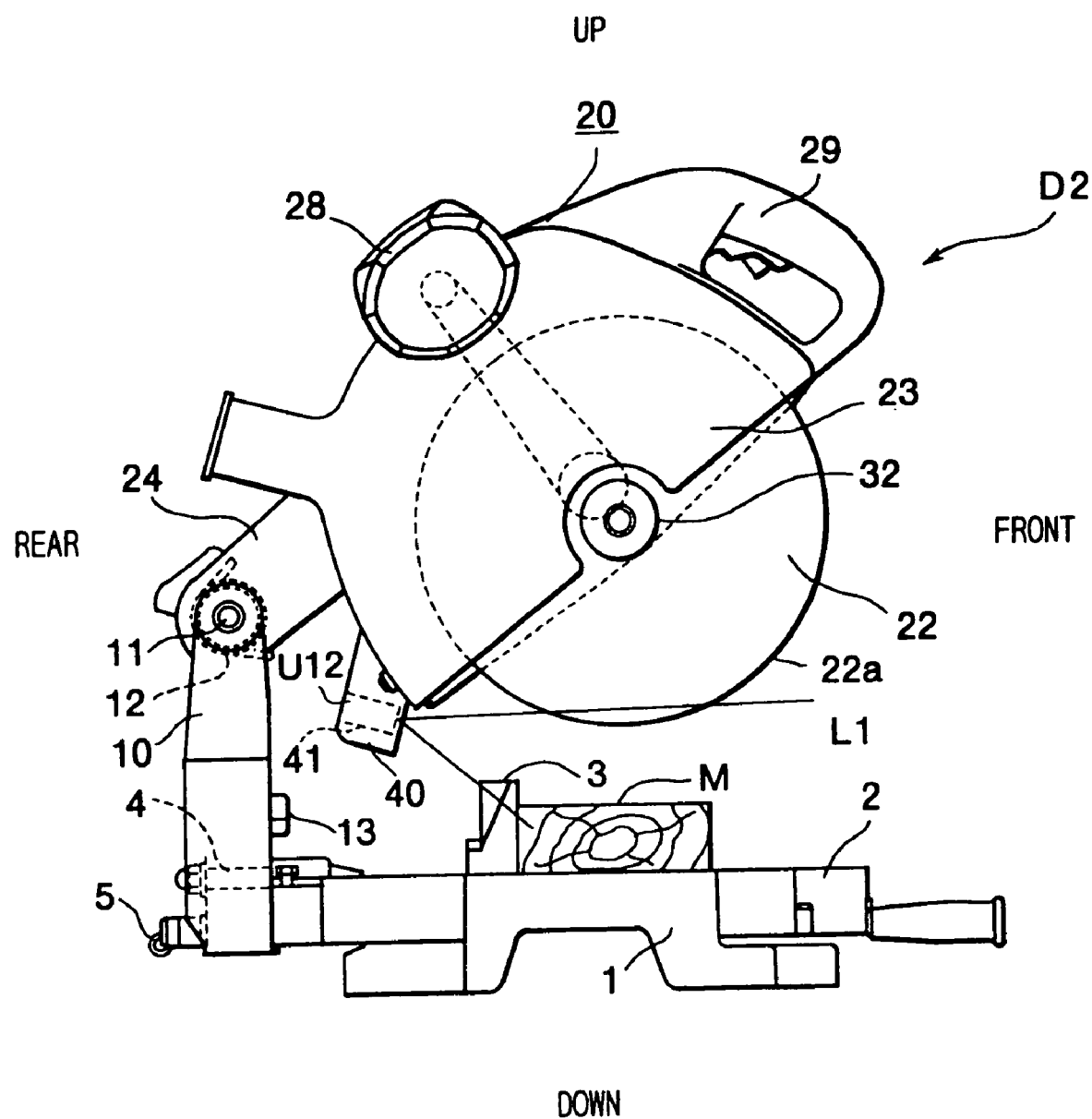
FIG. 42 is a side view showing a cutter according to a twelfth embodiment of the present invention.

FIG. 42 shows a cutter D2 according to the twelfth embodiment. In this embodiment, a laser unit U12 is fixed to the lower rear portion of the cover 23 of the cutter mechanism 20. As the laser unit, any of the laser units described in the first through eleventh embodiments is available.

FIGS. 43 through 46 show a cutter D3 according to the thirteenth embodiment, wherein like parts and components are designated by the same reference numerals as those shown in the first embodiment shown in FIG. 8. In the thirteenth embodiment, a holder 110 has an upper portion provided with a shaft support portion 110A where a pair of slide shafts 81A, 81B are movably supported. More specifically, the shaft support portion 110A is formed with a first hole 111 having a diameter greater than an outer diameter of the slide shaft 81A and a second hole 112 having a diameter equal to an outer diameter of the slide shaft 81B. A pair of bolts 113, 114 vertically extend through and are threadingly engaged with the shaft support portion 110A at a diametrically opposite position of the first hole 111. Each inner side of the bolt 113, 114, a plastic support 115 is provided slidably in the radial direction of the first hole 111. Each plastic support 115 has an inner end configured to match the outer peripheral surface of the slide shaft 81A.

The slide shaft 81B is axially slidably movable with respect to the second hole 112, and the slide shaft 81A is axially slidably movable with respect to the plastic supports 115. Further, the slide shaft 81A is rotatable about its axis upon loosening the bolt 113, and angular rotational position of the slide shaft 81A can be fixed upon fastening the bolt 114. In the latter case, the slide shaft 81A is still axially slidably movable with respect to the plastic supports 115.

A stop member 83 is fixed to each rear end of the slide shaft 81A, 81B so as to regulate the frontmost position of the slide shafts 81A, 81B. On the other hand, a front end of the slide shaft 81A is connected to a hinge holder 82. Each of the slide shafts 81A, 81B is covered with a bellows (not shown) along its entire length except the shaft support portion 110A.

The hinge holder 82 has an upper portion pivotally supports the cutter mechanism 20 through the shaft 11. Thus, the cutter mechanism 20 is mechanically linked with the slide shafts 81A, 81B through the hinge holder 82. Consequently, the cutter mechanism 20 can be slanted in accordance with the angular rotation of the slide shaft 81A. Further, the cutter mechanism 20 can be moved frontwardly or rearwardly in accordance with the axial sliding movement of the slide shafts 81A, 81B. Incidentally, a cutter having such slide shafts for moving the cutter mechanism in the horizontal direction is described in U.S. Pat. No. 5,060,548.

A laser unit U13 is fixed to the hinge holder 82. That is, a support member 40 of the laser unit U13 is fixed to the lower portion of the hinge holder 82, and a laser generator 41 of the laser unit U13 is housed in the support member 40. As the laser unit U13, any one of the laser units of the first through eleventh embodiment is available.

A dust cover 84 made from a rubber is fixed to the rear side of the saw cover 23 for preventing cutting chips from being adhered to the front face of the laser generator 41. To this effect, the dust cover 84 can be brought into alignment with and in front of the laser generator 41 when lowering cutter mechanism 20.

Inclination of the cutting mechanism 20 (see arrow A in FIG. 44) is mainly controlled by controlling pivoting amount of the holder 110 about the shaft 4 relative to the base 1. The pivot angle can be fixed by the clamp lever 5 as described above. Further, a minute inclination of the cutting mechanism 20 can be controlled by rotating the slide shaft 81A about its axis upon loosening and then tightening the bolts 113, 114. In this case, because the hinge holder 82 is also moved concurrently with the inclining movement of the cutter mechanism 20, the positional relationship between the circular saw blade 22 and the laser generator 41 can be maintained unchanged. Consequently, the laser light can correctly indicate the position of the circular saw blade 22.

Figure 43:
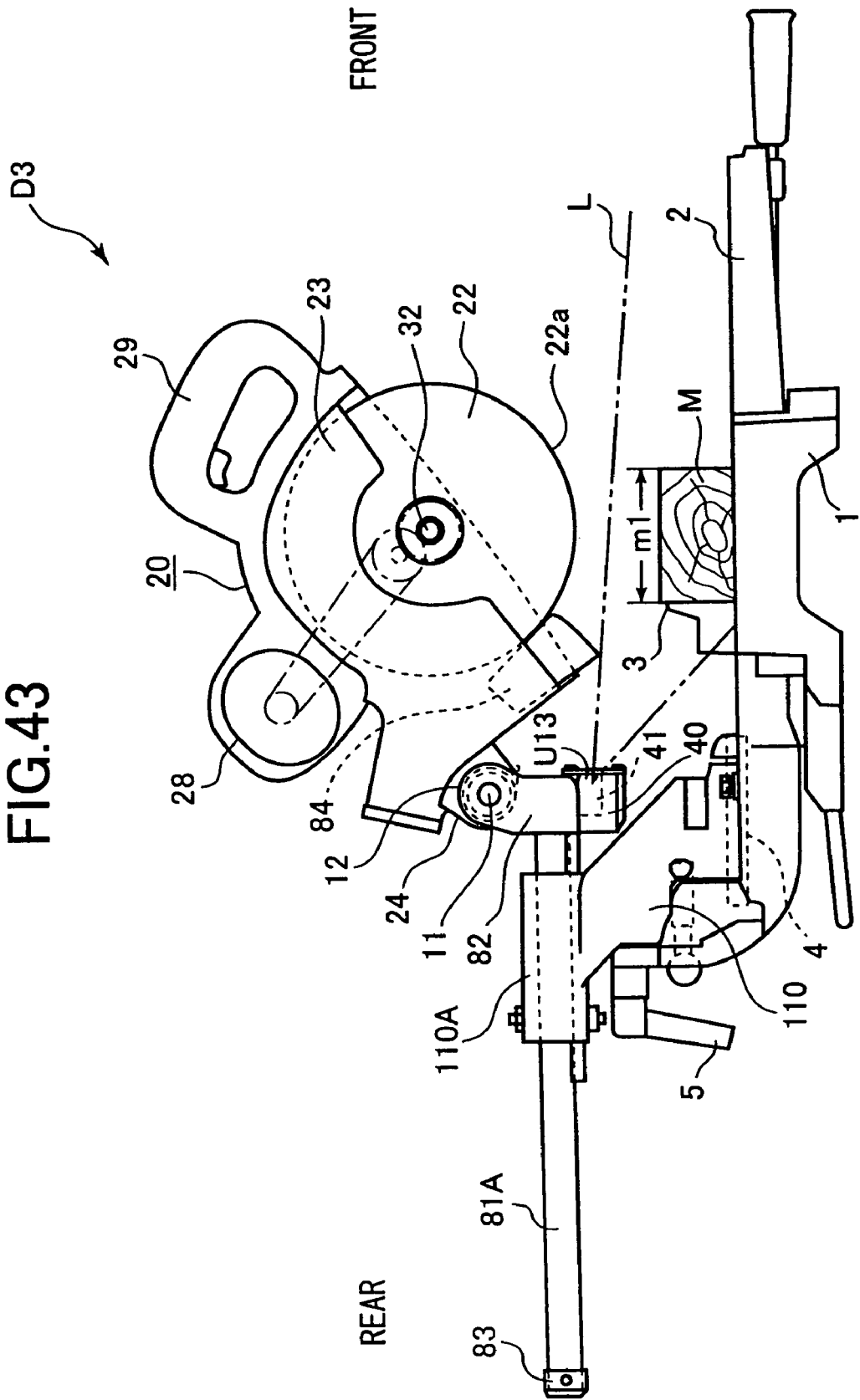
FIG. 43 is a side view showing a cutter according to a thirteenth embodiment of the present invention.
Figure 44:
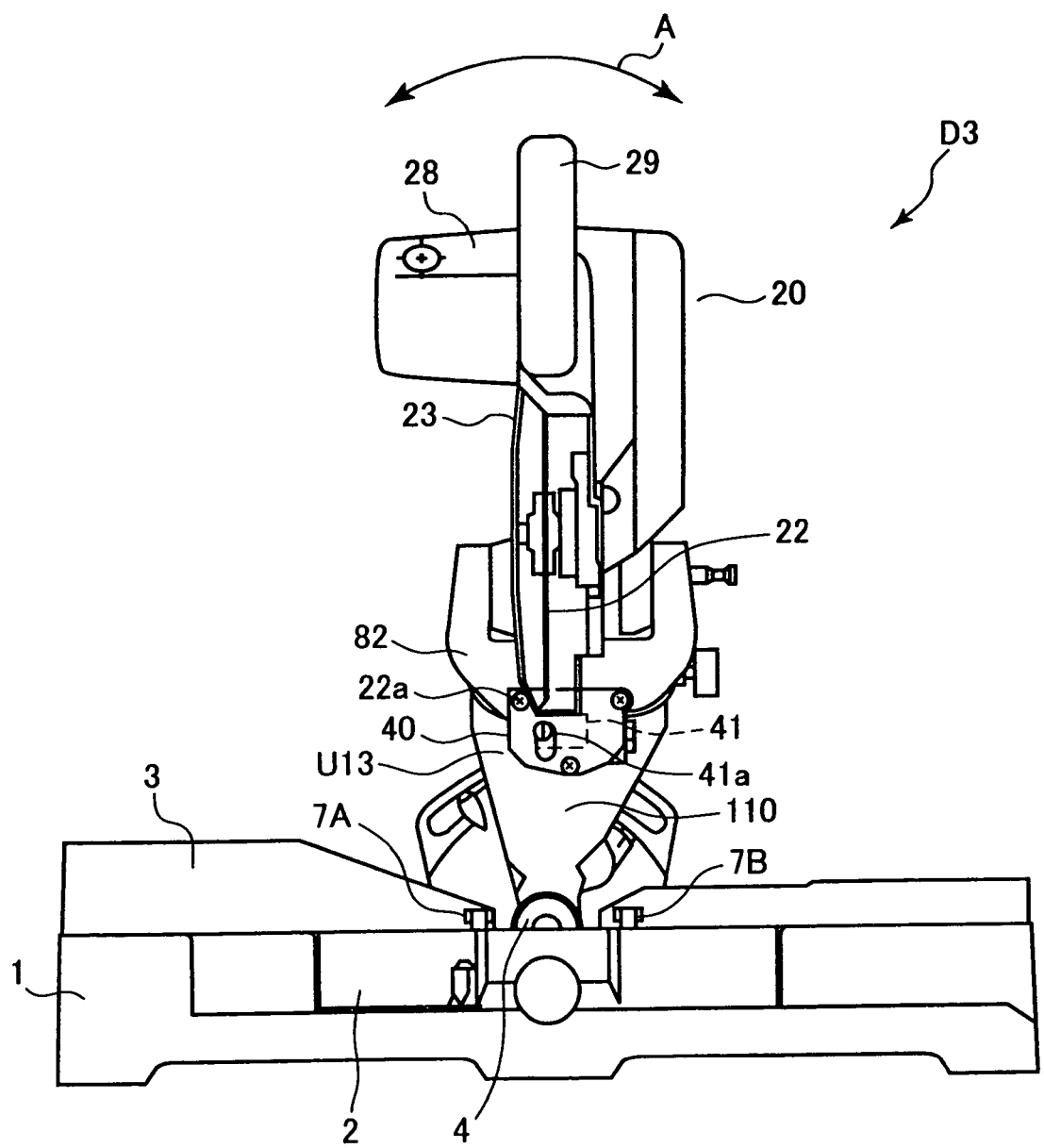
FIG. 44 is a front view showing the cutter according to the thirteenth embodiment.
Figure 45:
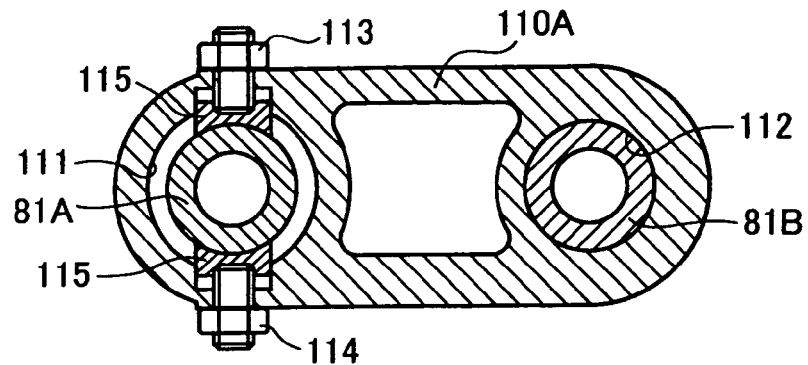
FIG. 45 is a cross-sectional view taken in the direction of an arrow XXXXV of FIG. 46 for showing a shaft support portion of a holder in the cutter according to the thirteenth embodiment; and, FIG. 46 is partial side view showing a cutting state of the cutter according to the thirteenth embodiment.

Further, because the laser generator 41 is positioned at the front side of the slide shaft 81, laser light can be irradiated brightly even toward a workpiece M having a relatively large width m1 (FIG. 43). If a workpiece M has a relatively large width which is not subjected to cutting only by the vertical pivotal movement of the circular saw blade 22, the slide shafts 81A, 81B are moved frontwardly for complete cutting over the width m1. In this case, because the laser generator 41 is also moved frontwardly, the laser light can irradiate brightly to the workpiece so as to facilitate alignment of the laser light with the cutting mark line.

Figure 46:
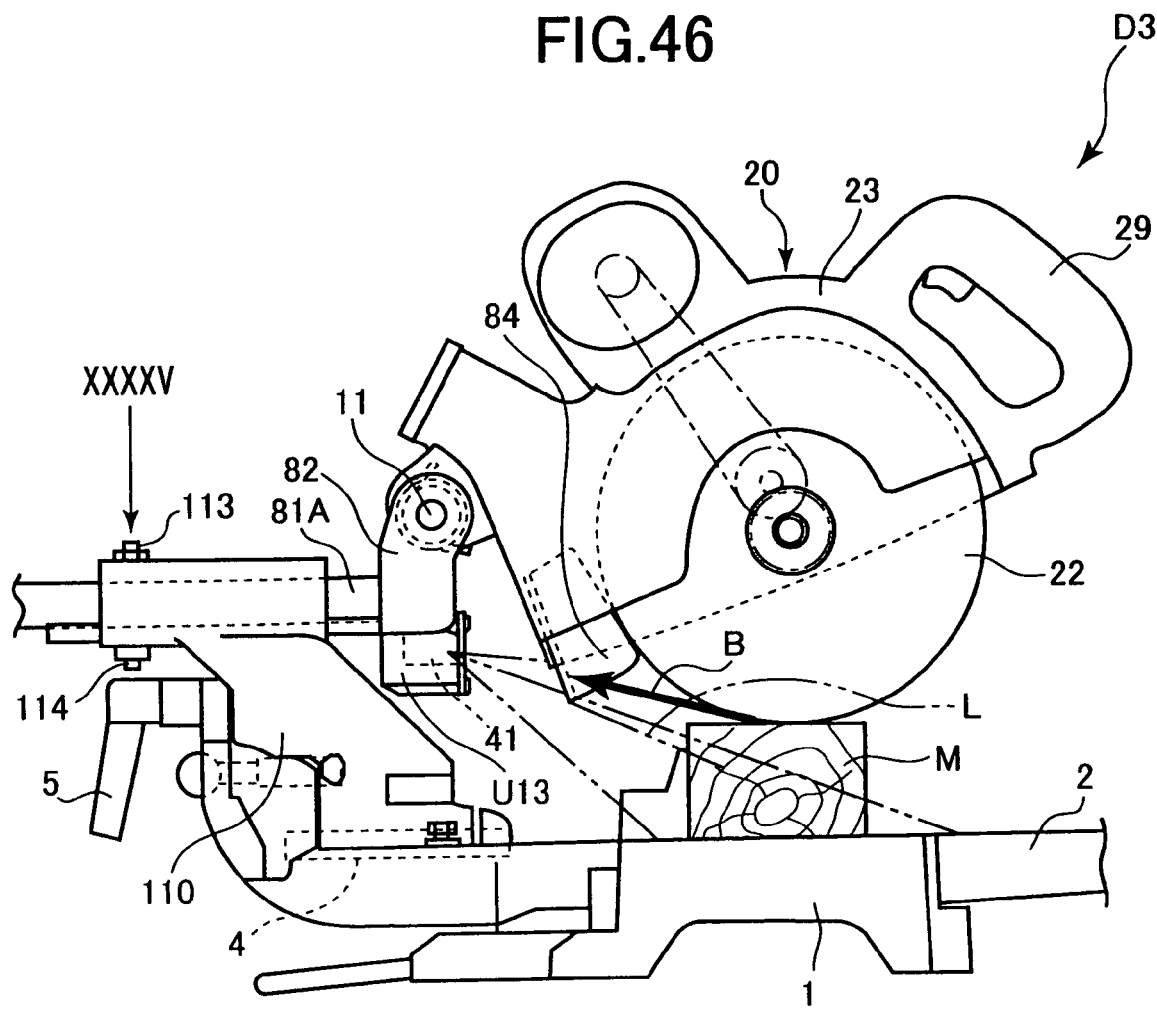

Furthermore, as shown in FIG. 46, the cutting chips are directed rearwardly as shown by an arrow B during cutting operation by the circular saw blade 22. However, the cutting chips are trapped by the dust cover 84. Therefore, the dust cover 84 can prevent the cutting chips from being adhered onto the light emitting side of the laser generator 41.

While the invention has been described in detail and with reference to specific embodiments thereof, it would be apparent to those skilled in the art that various changes and modifications may be made therein without departing from the sprit and scope of the invention. For example, although the above described embodiments pertain to a tabletop cutter with a swingable blade casing that supports a circular blade, the present invention can be applied to other types of cutters, such as band saws for example.

In addition, the configuration described in either the tenth or eleventh embodiments can be easily combined with any of the alignment-adjusting configurations described in the second to ninth embodiments.

Also, the cleaning mechanism described with reference to FIGS. 15 to 18 can be used with any of the cutters described in the second to thirteenth embodiments.

What is claimed is:

1. A miter saw comprising:
    a base portion for supporting a workpiece;
    a sliding mechanism supported on the base portion;
    a cutter portion pivotally mounted on the sliding mechanism whereby the cutter portion is movable relative to the base portion on the sliding mechanism, the cutter portion being pivotable between a raised non-cutting position and a lower cutting position and adapted to rotatably support a circular saw blade; and
    a laser generator for projecting laser light focused into a line which is narrow relative to the width of a blade edge of the circular saw blade from a portion of the sliding mechanism proximate to the cutter portion, whereby substantially all of the laser light is projected below the circular saw blade when the cutter portion is in the raised position,
    wherein the laser generator is operable to project the narrow focused line of laser light onto the workpiece at any location on the workpiece adjacent to or directly beneath the position of the circular saw blade, and
    the laser generator is arranged to slide with the cutter portion when the cutter portion slides relative to the base portion.

2. The miter saw as claimed in claim 1, wherein the sliding mechanism comprises:
    a slide shaft support portion;
    at least one slide shaft extending through the slide shaft support portion and slidably movable in a frontward and a rearward direction with respect to the slide shaft support portion, the at least one slide shaft having a front end; and
    a hinge holder fixed to the front end of the at least one slide shaft,
    wherein the cutter portion is supported on the hinge holder, and
    the laser generator is positioned between the slide shaft support portion and the circular saw blade.

3. The miter saw as claimed in claim 1, wherein the laser generator is arranged on the sliding mechanism.

4. The miter saw as claimed in claim 2, wherein the laser generator is arranged on the sliding mechanism.

5. The miter saw as claimed in claim 4, wherein the laser generator is attached to the hinge holder.

* * * * *